(12) United States Patent
Scheer

(10) Patent No.: US 7,313,534 B2
(45) Date of Patent: *Dec. 25, 2007

(54) SYSTEM AND METHOD FOR PREDICTIVE MAINTENANCE AND SERVICE PARTS FULFILLMENT IN A SUPPLY CHAIN

(75) Inventor: Robert H. Scheer, Chicago, IL (US)

(73) Assignee: W.W. Grainger, Inc., Lake Forest, IL (US)

( * ) Notice: Subject to any disclaimer, the term of this patent is extended or adjusted under 35 U.S.C. 154(b) by 1138 days.

This patent is subject to a terminal disclaimer.

(21) Appl. No.: 09/867,068

(22) Filed: May 29, 2001

(65) Prior Publication Data

US 2002/0143598 A1 Oct. 3, 2002

Related U.S. Application Data

(60) Provisional application No. 60/263,317, filed on Jan. 22, 2001.

(51) Int. Cl.
*G06F 9/46* (2006.01)
(52) U.S. Cl. .................................. 705/9
(58) Field of Classification Search ............ 705/8, 705/9, 10
See application file for complete search history.

(56) References Cited

U.S. PATENT DOCUMENTS

| | | | |
|---|---|---|---|
| 4,383,298 A | | 5/1983 | Huff et al. |
| 4,459,663 A | * | 7/1984 | Dye ............................ 705/29 |
| 4,827,423 A | | 5/1989 | Beasley et al. |
| 5,040,123 A | | 8/1991 | Barber et al. |
| 5,089,970 A | | 2/1992 | Lee et al. |
| 5,216,612 A | | 6/1993 | Cornett et al. |
| 5,287,267 A | | 2/1994 | Jayaraman et al. |
| 5,311,562 A | * | 5/1994 | Palusamy et al. ........... 376/215 |
| 5,317,503 A | | 5/1994 | Inoue |

(Continued)

FOREIGN PATENT DOCUMENTS

EP 0467257 A2 * 1/1992

(Continued)

OTHER PUBLICATIONS

Andel, Tom, Maintenance Keeps Supply Chains Stong Transportation & Distribution, Aug. 1998, vol. 37, No. 8, pp. 84-86.*

(Continued)

*Primary Examiner*—Tariq R. Hafiz
*Assistant Examiner*—Scott L. Jarrett
(74) *Attorney, Agent, or Firm*—Greenberg Traurig, LLP

(57) ABSTRACT

A supply chain transaction network. The network includes a customer agent server hosting a collection of intelligent customer agents for interfacing with and extracting information from one or more of a condition monitoring system, a computer maintenance management system and a procurement system and a distributor agent server hosting a collection of intelligent distributor agents for interfacing and communicating with one or more of a supply chain planning system, an inventory management system, a logistic management system, an order management system, an intelligent order fulfillment system, and an equipment knowledge base. An agent network manager and broker routes messages between the distributor agent server and the customer agent server to effect a movement of items within the supply chain.

11 Claims, 14 Drawing Sheets

U.S. PATENT DOCUMENTS

| | | | |
|---|---|---|---|
| 5,331,579 A * | 7/1994 | Maguire et al. | 703/2 |
| 5,367,452 A | 11/1994 | Gallery et al. | |
| 5,377,098 A | 12/1994 | Sakai | |
| 5,528,489 A * | 6/1996 | Asahara et al. | 705/9 |
| 5,596,507 A * | 1/1997 | Jones et al. | 700/276 |
| 5,611,051 A | 3/1997 | Pirelli | |
| 5,682,728 A | 11/1997 | DeBusk et al. | |
| 5,710,723 A * | 1/1998 | Hoth et al. | 702/181 |
| 5,732,401 A | 3/1998 | Conway | |
| 5,764,543 A | 6/1998 | Kennedy | |
| 5,787,283 A | 7/1998 | Chin et al. | |
| 5,819,232 A | 10/1998 | Shipman | |
| 5,845,272 A * | 12/1998 | Morjaria et al. | 706/50 |
| 5,877,961 A | 3/1999 | Moore | |
| 5,884,300 A | 3/1999 | Brockman | |
| 5,946,662 A * | 8/1999 | Ettl et al. | 705/8 |
| 5,953,707 A * | 9/1999 | Huang et al. | 705/10 |
| 5,960,414 A | 9/1999 | Rand et al. | |
| 5,974,395 A | 10/1999 | Bellini et al. | |
| 5,995,945 A | 11/1999 | Notani et al. | |
| 6,006,171 A * | 12/1999 | Vines et al. | 702/184 |
| 6,006,192 A | 12/1999 | Cheng et al. | |
| 6,006,196 A * | 12/1999 | Feigin et al. | 705/10 |
| 6,032,125 A | 2/2000 | Ando | |
| 6,041,267 A | 3/2000 | Dangat et al. | |
| 6,044,357 A | 3/2000 | Garg | |
| 6,049,742 A | 4/2000 | Milne et al. | |
| 6,061,691 A | 5/2000 | Fox | |
| 6,078,900 A * | 6/2000 | Ettl et al. | 705/28 |
| 6,088,626 A | 7/2000 | Lilly et al. | |
| 6,094,603 A | 7/2000 | Ishii | |
| 6,097,995 A | 8/2000 | Tipton et al. | |
| 6,119,102 A | 9/2000 | Rush et al. | |
| 6,154,728 A | 11/2000 | Sattar et al. | |
| 6,167,380 A | 12/2000 | Kennedy et al. | |
| 6,167,385 A | 12/2000 | Hartley-Urquhart | |
| 6,182,053 B1 | 1/2001 | Rauber et al. | |
| 6,188,991 B1 | 2/2001 | Rosenweig et al. | |
| 6,192,325 B1 * | 2/2001 | Piety et al. | 702/184 |
| 6,324,522 B2 * | 11/2001 | Peterson et al. | 705/28 |
| 6,614,882 B1 * | 9/2003 | Beamon et al. | 379/27.01 |
| 6,742,000 B1 * | 5/2004 | Fantasia et al. | 707/104.1 |
| 6,810,406 B2 * | 10/2004 | Schlabach et al. | 707/201 |
| 6,832,205 B1 * | 12/2004 | Aragones et al. | 705/10 |
| 6,959,235 B1 * | 10/2005 | Abdel-Malek et al. | 701/33 |
| 7,016,774 B2 * | 3/2006 | Barber et al. | 701/30 |
| 2001/0034673 A1 * | 10/2001 | Yang et al. | 705/28 |
| 2002/0035495 A1 * | 3/2002 | Spira et al. | 705/7 |
| 2002/0065698 A1 * | 5/2002 | Schick et al. | 705/8 |
| 2002/0073012 A1 * | 6/2002 | Lowell et al. | 705/37 |
| 2002/0103690 A1 * | 8/2002 | Lyon et al. | 705/9 |
| 2003/0055666 A1 * | 3/2003 | Roddy et al. | 705/1 |

FOREIGN PATENT DOCUMENTS

| WO | WO 98/24042 | * 11/1997 |
|---|---|---|

OTHER PUBLICATIONS

Songini, Marc L, Navy embarks on supply-chain mission Computerword, Jan. 15, 2001, vol. 35, No. 3.*

Weiss, Gerhard, Multiagent Systems: A Modern Approach to Distributed Artificial Intelligence The MIT Press, Jul. 31, 2000, ISBN: 0262731312.*

Dilger, Karen Abramic, To Protect and Serve Manufacturing Systems,Jun. 1997, vol. 15, No. 6., pp. 22-28.*

MRO.com Delivers Buy-Side Online Procurement Solution for Purchasing MRO Materials and Services PR NewsWire, Jun. 24, 1999.*

Griffin, Kate, Grainger adds Web to Arsenal National Home Center News, Aug. 9, 1999, vol. 25, No. 15.*

Avery, Susan, Electronic Tools help distributors meet service demands Purchasing, May 4, 2000.*

McColm, Neal et al., Simulation Model for Multi-Level Distribution System Planning IEEE 1982.*

Graves, Stephen, A Multiple-Item Inventory Model with Job Completion Criteria Management Science, vol. 28, No. 11, 1982, pp. 1334-1337.*

Gullinan, Gregory F., Tracking work orders with a microcomputer Plant Engineering, vol. 38, Apr. 12, 1984.*

Mamer, John W. et al., Job Completion Based Inventory Systems: Optimal Policies for Repair Kits and Spare Machines Management Science, vol. 31, No. 6, Jun. 1985, pp. 703-718.*

Katzel, Jeanine, Maintenance Management Software Plant Engineering, vol. 41, Jun. 18, 1987.*

Cohen, Morris et al., Optimizer: IBM's Multi-Echelon Inventory System for Managing Service Logistics Interfaces, Vo. 20, No. 1, Jan.-Feb. 1990, pp. 65-82.*

Cohen, Morris A. et al., Out of Touch With Customer Needs? Space Parts and After Sales Service Sloan Management Review, Winter 1990, vol. 31, No. 2, pp. 55-66.*

Lahiri, Santi B., A Decision-Support Modeling System for Minimization of Logistic Support Cost Production and Inventory Management Journal, Fourth Quarter 1992, vol. 33, No. 4, pp. 75-80.*

Langan, George, Maintenance Automation: Out of the broom closet and into the boardroom IIE Solutions, vol. 27, No. 7, Jul. 1995, pp. 14-17.*

Agrawal, Vipul, Planning Models for Multi-Level Distribution Systems University of Pennsylvania, AAT 9615007, 1995, Abstract.*

Ashayeri, J. et al., Inventory Management of Repairable Service Parts for Personal Computers: A Case Study International Journal of Operations & Production Management, vol. 16, No. 12, 1996.*

Cohen, Morris A. et al., Service Parts Logistics: A Benchmark Analysis IIE Transactions, Vo..29, No. 8, Aug. 1997.*

Teachey, Daniel, What Is A CMMS, And Why Should You Care? EC&M, Mar. 1, 1998.*

Lamedola, Mark, Beyond Work Orders: Get More from you CMMS EC&M, Oct. 1, 1999.*

Dilger, Karen A., Asset Management Exchange Bound Manufacturing Systems, Jun. 2000, vol. 18, No. 6, pp. 43-48.*

Botter, Rene et al., Stock Strategy For Service Parts: A Case Study International Journal of Operations & Production Management, vol. 20, No. 6, 2000.*

Cohen, Morris A. et al., Saturn's Supply-Chain Innovation: High Value in After Sales Service Sloan Management REview, Summer 2000, vol 41, No. 4, pp. 93-101.*

Kalakota, Ravi et al., Readings in Electronic Commerce Addison Wesley Longman, Inc., Oct. 1995, ISBN 0-201-88060-1.*

Patton, Joseph et al., Service Management Principles and Practice Instrument Society of America, Third Edition, 1994, ISBN: 1-55617-491-8.*

Orsburn, Douglas K., Spares Management Handbook McGrawHill, 1991, ISBN: 0-8306-7626-0.*

Luxhoj, James T. et al., Probalistic Spares Provisioning for Repairable Population Models Journal of Business Logistics, vol. 9, No. 1, 1988.*

Cohen Morris A., et al., Identifying Opportunities for Improving Teradyne's Service-Parts Logistics System Interfaces, vol. 29, No. 4, Jul./Aug. 1999, pp. 1-18.*

Wang, Yunzeng, Service Parts Logistics: Modeling, Analysis and Application University of Pennsylvania, 1998.*

Patton, Joseph Jr. et al., Service Parts Handbood The Solomon Press Publishers, '99, ISBN 0-934623-73-2.*

Michael Bittner, E-Business Requires Supply Chain Event Management, The Report on Supply Chain Management, Nov. 2000, pp. 1-25, AMR Research, Inc.

Robert Ferrari, Demand Planning and Management Will Leverage the Web, The Report on Supply Chain Management, Dec. 2000, pp. 3-25, AMR Research, Inc.

Bob Parker, Buildign a Collaboration Strategy, The Report on Supply Chain Management, Jan. 2001, pp. 29-31, AMR Research, Inc.

Charles C. Poirier and Stephen E. Reiter, Supply Chain Optimization, 1996, pp. 224-259, Berrett-Koehler Publishers, Inc.

Charles C. Poirier, Advanced Supply Chain Management, 1999, pgs. Exhibit 6.2, 105-106, 174, Berrett-Koehler Publishers, Inc.

Aimo Hinkkanen, Ravi Kalakota, Porama Saengcharoenrat, Jan Stallaert, and Andrew B. Whinston, Distributed Decision Support Systems for Real-Time Sypply Chain Management Using Agent Technologies, 1997, pp. 275-291, Addison Wesley Longman, Inc.

Supply-Chain Operations Reference-Model, Version 4.0, 2000, pp. 1-20, Supply Chain Council, Inc.

David Berger, A Look into the Future of Asset Optimization, Asset Magazine, vol. 1, Issue 1, pp. 1-19.

Maincor Maintenance Management Software, Brochure, 6 pgs.

Eryn Brown, 9 Ways to Win on the Web, Fortune, May 24, 1999, 2 pgs.

Christopher Carlson, Pitney Bowes Gets the Message, Electronic Commerce World, Apr. 1999, 5 pgs.

A Management Briefing on VendorSite, Prepared for W.W. Grainger, Inc., Feb. 1, 2000, pp. 1-16.

Your Window Into Your Supply Chain, Eventra, 1998, 4 pgs.

VendorSite, A Focus on ROI, Eventra, 4 pgs.

Larry Lapide, Focus Group on Supply Chain Collaboration, The Report on Supply Chain Management, Apr. 1999, pp. 17-22, AMR Research, Inc.

Scott Lundstrom, Business Community Integration—The Next Wave, The Report on Enabling Technologies, Aug. 1999, pp. 3-17, AMR Research, Inc.

Bob Parker, Should Internet Procurement Be a Priority for The Enterprise?, The Report on Enabling Technologies, Oct. 1998, pp. 3-24, AMR Research, Inc.

Susan Avery, Distribution Redefines Itself, Purchasing online, May 7, 1998, pp. 1-17.

Demand Activated Manufacturing Architecture, DAMA Project, DAMA Model for Collaboration, Oct. 2000, pp. 1-20, Sandia Corporation.

Chris Newton, Warehousing Isn't Just About Storage Anymore, The Report on Supply Chain Management, Oct. 1999, pp. 1-28, AMR Research, Inc.

Mark Bittenbender, AlliedSignal balances Inventory and service levels across its supply chain to increase customer satisfaction and internal cash flow, 6 pgs., AlliedSignal.

LPA Vision, Supply Chain Management Software, 26 pgs., LPA Software, Inc.

\* cited by examiner

SYSTEM AND METHOD FOR PREDICTIVE MAINTENANCE AND SERVICE PARTS FULFILLMENT IN A SUPPLY CHAIN

This application claims priority to U.S. Provisional Application Ser. No. 60/263,317 filed on Jan. 22, 2001 which is incorporated herein by reference in its entirety.

BACKGROUND OF THE INVENTION

This invention relates generally to supply chain management and, more particularly, relates to a system for providing integrated supply chain management using networked computer systems.

In the global economy of today, supply chains are commonly used to deliver goods reliably and at affordable prices. A supply chain typically involves the flow of material, information, and money between customers, suppliers, manufacturers, distributors and, possibly, financial institutions. Material flow includes, among other things, the physical product flows from suppliers to customers through the chain and reverse flows via product returns, servicing, recycling, and disposal. Information flow involves order transmission, order confirmation, and delivery status. Monetary or financial flow includes credit terms, payment schedules, payments, and consignment and title ownership arrangements. These flows cut across multiple functions and areas both within an organization and across organizations. In this regard, supply chains exist in service, retail, and manufacturing organizations, although the complexity of the supply chain may vary greatly from industry to industry and organization to organization. The coordination and integration of the material, information and financial flows within and across organizations is critical to effective supply chain management. Thus, in order for the supply chain to work for its intended purpose, all organizations involved in the supply chain must coordinate their activities with one another so that efficiency throughout the supply chain is achieved.

To coordinate activities within a supply chain, Manufacturing Resource Planning ("MRP") and Enterprise Resource Planning ("ERP") tools have been employed by organizations in an effort to gain control of the flows, plant operations, and to provide management with timely and useful reporting. Some companies use explicit supply chain management ("SCM") and supply chain execution ("SCE") systems which are often focused on a specific functional requirement. Generally, MRP systems have been used to translate the schedule for the production of products into time-phased net requirements for the sub-assemblies, components and raw materials, planning and procurement. ERP systems address the technology aspects of MRP such as client/server distributed architecture, RDBMS, object oriented programming etc.

In addition to MRP, ERP, SCM/SCE systems, a further supply chain management tool is described in U.S. Pat. No. 6,157,915 which relates to an active collaboration technology in an open architectural framework that is used to deliver information and decision support tools to various organizations. In the framework described in the '915 patent, the people across the organizations collaborate through domain task and specific active documents. The active documents contain both the necessary business information and decision support tools. Dynamic decision making is thus made possible through the delivery of active documents to appropriate parties in response to events that are triggered by business processes, the organizations themselves, or other applications. In this manner, the active documents allow organizations to exchange information, use decision tools to act on the shared information, respond to dynamic events that require decision making, and engage the proper role players in accordance with the business process.

The method and means described in the '915 patent provide the most value in a manufacturing supply chain where people from all the supply chain partners collaborate to create the production and distribution plans (called "business scenarios"). The '915 patent focuses on user access security, workflow routing of the "active documents" (i.e., Lotus Notes documents) and the inclusion in those documents of links to data warehouse information sources and decision support tools which the users can utilize in defining, analyzing, modifying, and approving the business scenarios. While generally response to the needs of the supply chain partners, the system and method described in the '915 does suffer, among other disadvantages, the disadvantage of requiring human involvement in the analysis, planning, and approval stages.

SUMMARY OF THE INVENTION

To overcome this and other disadvantages prevalent in currently implemented supply chain management tools, the subject invention resides in a supply chain transaction network that generally includes a customer agent server hosting a collection of intelligent customer agents and a distributor agent server hosting a collection of intelligent distributor agents. The customer agents interface with and extract information from one or more of a condition monitoring system, a computer maintenance management system and a procurement system. By way of example, the customer agents can extract information pertaining to scheduled maintenance activities from a system at a customer site to create an advance demand notice order that identifies one or more items expected to be used during a repair procedure. The distributor agents interface and communicate with one or more of a supply chain planning system, an inventory management system, a logistic management system, an order management system, an intelligent order fulfillment system, and an equipment knowledge base. By way of example, the distributor agents can respond to the advance demand notice order to interface with systems at one or more distributor's sites to initiate a staging of the items within the supply chain to meet an expected use of the items during the repair procedure. An agent network manager and broker is provided for routing messages between the distributor agent server and the customer agent server to effect the movement of items within the supply chain.

A better understanding of the objects, advantages, features, properties and relationships of the invention will be obtained from the following detailed description and accompanying drawings which set forth an illustrative embodiment and which is indicative of the various ways in which the principles of the invention may be employed.

BRIEF DESCRIPTION OF THE DRAWINGS

For a better understanding of the invention, reference may be had to a preferred embodiment shown in the following drawings in which.

DETAILED DESCRIPTION

Figure 1:
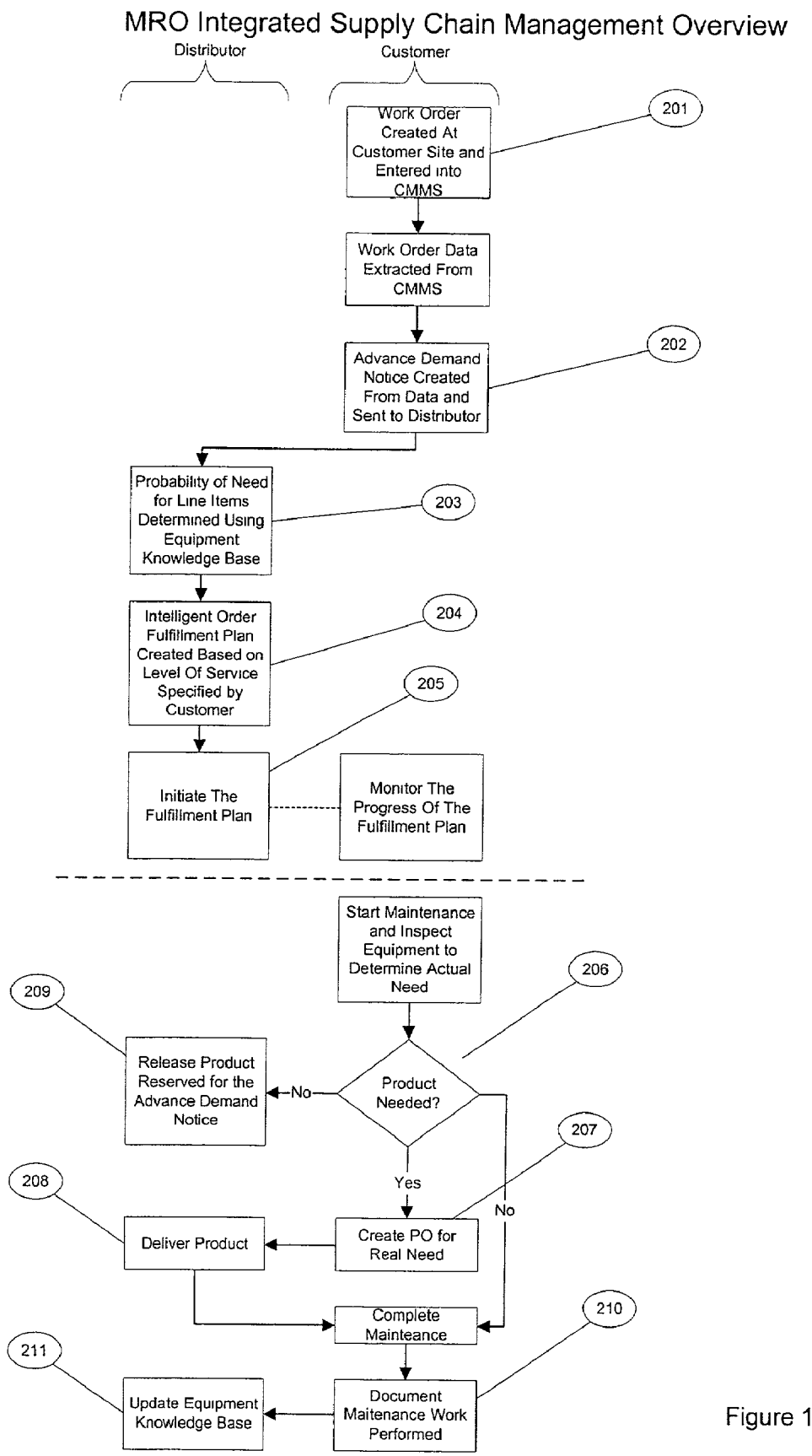
FIG. 1 is a diagram illustrating an exemplary process for use in providing integrated supply chain management.

Turning now to the figures, wherein like reference numerals refer to like elements, there is illustrated an automated, comprehensive, end-to-end supply chain management system that connects customers, distributors, and suppliers. Within the figures, it will be appreciated that the distributor is sometimes referenced as "Grainger." In particular, the system allows the supply chain participants to have cognizance of the entire operation of the supply chain as it pertains to their respective business interests. As will become apparent from the description that follows, the system is particularly adapted for use in supply chains where supply chain management and execution is done as a result of specific business transactions between the customer and the distributor and the fulfillment of the customer's requirement is not always done in a routine, repetitive, or pre-defined manner. A specific example of such a supply chain is a maintenance, repair, and operating ("MRO") supply chain.

More specifically, the supply chain management system and method of the present invention will allow companies to operate an entire supply chain on a "just in time" basis without requiring those companies to keep an excessive level of product safety stock on hand. The supply chain management system will achieve this goal by being implemented on a comprehensive and reliable data communications network that serves as the foundation for the connectivity between the supply chain participants. The system includes a collection of functions and features implemented in software and/or hardware that make the operation and management of the supply chain as automated as possible. The software includes intelligent software agents that are distributed across the supply chain. The intelligent software agents allow for the monitoring and managing of state changes in the supply chain.

For determining the amount of inventory needed by a particular supplier, the supply chain management system also includes a database of forecast data. The forecast data may be comprised of the following:

(1) Expected consumption rates based on historical data. The expected consumption rates can be developed by tracking actual consumption rate data for customers and compiling a database of those actual consumption rates. This can be accomplished by providing a collaborative relationship between the distributor and the customer and continually updating the actual consumption rate data and the expected consumption rate data;

(2) Deterministic demand data based on scheduled maintenance for customer equipment and/or facilities including an Equipment Knowledge Database comprised of reliability data, maintenance requirements and completed maintenance job data. The deterministic demand data may also include information related to expected repair parts, contingent repair parts, ancillary supplies and necessary tools. The customer may also choose to maintain a small "just in case" inventory or to receive "just in time" delivery from the distributor. Again, a collaborative relationship will be required between the customer, the distributor, and the supplier for developing and maintaining a deterministic demand database that is populated with deterministic demand data; and (3) Non-deterministic demand data based on the Equipment Knowledge Base. The non-deterministic demand data is formulated by comparing historical maintenance history for customer equipment to schedule maintenance plans. The difference between the historical maintenance demand level and the preventive maintenance demand level produces the non-deterministic demand data. In contrast to the basing of inventory on aggregate market forces, the non-deterministic demand data is advantageous because it is compiled at a customer-specific level (regarding planned maintenance work, equipment inventories, and the general condition of that equipment as it pertains to potentially needing maintenance) that makes the data more useful and precise.

The above-described databases are populated by data from the customer, the distributor, the supplier/manufacturer and possibly third party data compilers/publishers. For example, the customer will supply historical maintenance results, advance demand order information, and scheduled maintenance information, which may include scheduled preventive maintenance, condition-based maintenance, planned maintenance projects, etc. The equipment manufacturer will provide equipment maintenance information, replacement information, and data on anticipated reliability. The distributor will supply actual consumption rate information.

In operation, assuming that the customer has cataloged its equipment and similar inventory into a computerized maintenance management system ("CMMS"), the customer begins by creating a work order 201 as illustrated in FIG. 1. The work order can result from automated monitoring of the customer equipment, preventive maintenance planning, periodic and routine maintenance schedules, planned maintenance projects or unplanned equipment failures. The work order will include information such as possible repair parts, consumables, supplies, and tools and equipment needed for the task. The work order can also be stored in the CMMS. An intelligent agent works in connection with the CMMS system and monitors for any entered or modified work orders. The intelligent agent extracts appropriate data from the CMMS system to create an advance demand notice for products that may be required for a particular maintenance task 202. It will also be appreciated that an advance demand notice can be created manually by the customer.

If the customer should change, reschedule, otherwise modify or cancel the maintenance work order in the maintenance system, the intelligent agent that monitors the maintenance system will detect such a change. Since such changes to the work order may necessitate a change in the advance demand notice, the intelligent agent should respond to any change in a work order to accordingly change the advance demand notice. Furthermore, as will be apparent from the description that follows, changes to an advance demand notice may or may not require changing the actions of the supply chain management and processing system, i.e., by changing the fulfillment plan, the execution of a selected fulfillment plan, etc.

The distributor connected to the supply chain management system will receive the advance demand notice from the intelligent agent and a further team of intelligent agents will collaborate to determine the probability that the product (s) listed in the work order will be needed 203. This determination is made, in part, by using the forecast data. An intelligent agents may also be used to determine if the customer already has the product in house or if the product will be needed from the distributor or supplier. The advance demand notice is updated with this probability information.

In an alternative embodiment, a probability of need can be provided by the customer in an advance demand notice order. The customer may have knowledge of the probability of need from internal condition monitoring systems, equipment status assessment systems or other internal system/sources. As noted, if the customer does not provide the probability of need data, the distributor can estimate a probability of need based on data contained in an equipment knowledge base, described hereinafter. Such estimates by the distributor can utilize historical data from multiple customer's experiences with like or similar instances of equipment or parts being maintained.

At the distributor, an intelligent software agent may accept the advance demand notice and determine a fulfillment level for the product 204. Examples of fulfillment levels include the "level of service" and the "speed and convenience" models. Level of service refers to planned purchases when the customer can designate a point in the supply chain where product should be staged and reserved for anticipated use based on a trade-off between the risk of untimely availability and the staging costs. Speed and convenience refers to unplanned purchases when the customer requires immediate product availability and delivery. The fulfillment level for a particular product may be dependent upon several factors, such as the amount of lead time preceding a particular maintenance task, the inventory supply category for the product, and other factors determined by the supply chain management system.

By way of example, if the fulfillment level is the speed and convenience model, the buy-hold-sell ("BHS") procedures and practices will be implemented. Moreover, if the probability of demand is 100% in the speed and convenience model, then the product will be shipped from the distributor to the customer. If the probability is less than 100%, the product will be reserved for this demand, but kept at is current location.

Based on a plurality of sourcing factors, intelligent agents determine sourcing alternatives for the advance demand notice. The sourcing factors may include factors, such as, the required fulfillment level for a particular customer, the inventory supply category for the product, the lead time required for the maintenance project, and the number of sourcing suppliers capable of providing the product to the customer according to the customer's time and delivery constraints. If an automated sourcing alternative cannot be generated, an intelligent agent should contact a designated customer contact to initiate the offline selection of a sourcing option. The customer contact may be charged with coordinating the approval procedure at the customer site. The designated customer contact can be contacted via telephone, e-mail, or similar communication means. All off-line decisions by the designated customer contact should be entered into the customer system and synchronized with the supply chain management system including the distributor computer system, the supplier computer system and any other computer system attached to the supply chain management system that tracks customer purchase orders.

For automatically generating sourcing options, an intelligent agent may first determine the distributor's ability to provide the product. For example, the product may be held on an available to promise ("ATP") or capable to deliver ("CTD") status. The various sourcing options are established supply chain methods and practices. For example, if the product is being sourced from the distributor, then a fulfillment level may be provided with the advance demand notice. The available fulfillment levels may start back, i.e., "upstream," as far as possible in the distribution network. Once the supply chain management system validates a particular sourcing option, the supply chain management system may then issue a purchase order for the product in accordance with the level of service requirement provided within the advance demand notice constraints.

It will be appreciated that a fulfillment plan may reach "upstream" to involve a supplier if a product must be ordered from the supplier for the subject advance demand notice either to be staged at some point in the logistics network or to be shipped directly from the supplier to the customer. The supplier will also be involved in the fulfillment plan if the plan has the advance demand notice being sourced from the distributor's stock, and the distributor's inventory will have to be immediately replenished if the customer does really need the product that has been reserved. Depending on the supplier's level of business process sophistication, technology sophistication, electronic communications capabilities, and manufacturing methods utilized for the product (e.g., make-to-order or make-to-stock), the supplier may become collaboratively involved in the fulfillment planning process by providing the available to promise ("ATP") and capable to deliver ("CTD") information to the distributor.

A fulfillment plan will be attached to the advance demand notice and any product retained within the inventory of the distributor's logistic network will be committed as part of the fulfillment plan. The reservation and commitment of product to the advance demand notice may require the distributor to move and reposition the product to different stocking points in order to comply with the customer's level of service specifications. The planning should also account for the distributor's safety stock requirements at the various stocking points. The supply chain management system may monitor the progress of the fulfillment plan and may make this information available to suppliers and customers. The fulfillment status may also be monitored by authorized parties to allow the parties to track delivery of the products. If the movement is not proceeding according to the plan, corrective and responsive actions can be initiated. The actions may include the determination and execution of a new, alternative fulfillment plan which takes into account the current state and status of the logistics network that caused the initial fulfillment plan to fail.

As noted, an intelligent agent may be used to verify that the fulfillment plan is being executed according to the level of service requirements provided by the customer 205. If the fulfillment plan is not properly executed, an intelligent agent can be used to generate responsive and/or corrective fulfillment plans. If no corrective fulfillment plans can be generated, then an intelligent agent should contact the designated customer contact and formulate an offline sourcing solution for the fulfillment plan. An intelligent agent may also be in charge of processing any changes in the advance demand notice constraints and generating amended fulfillment plans based on those changes. The advance demand notice constraints may also include payment terms for the product. The payment terms may include information, such as form of payment and the timing of payment. In addition to tracking the status of the fulfillment plan, an intelligent agent may also initiate billing cycles and send invoices to customers.

If the probability of demand is 100% for a particular product the customer may use the advance demand notice as the purchase order or issue an independent purchase order. If the advance demand notice serves as the purchase order, the product may be automatically delivered to the customer. If the probability of demand is less than 100% the product will remain at a delivery site in accordance with the level of service agreement. When the customer determines that the product is actually needed 206, a purchase order will be submitted electronically via the customer computer system 207. Electronic submission of purchase orders allows the supply chain management system to process purchase orders on a real-time basis. The supply chain management system will then provide the product to the customer by releasing the product for pick-up from a distribution branch, shipping the product to the customer from a distribution center, providing for drop shipment from the supplier to the customer, or issuing the product from on-site inventory which is managed by the supply chain management system 208.

When the probability of demand is less than 100%, the advance demand notice may also indicate how long the product should be held at the final staging point before a purchase order must be received from the customer. For example, if the probability of demand is only 50% and a purchase order is not received within a designated time, then the supply chain management system will assume that the product is not needed in the maintenance task and determine what should be done with the product 209. Depending on the contractual agreement with the customer, there may be a restocking fee for unneeded products.

When a maintenance task is complete, an intelligent agent can capture pertinent maintenance data which includes, among other things, lists and quantities of products used during the maintenance work and statements of equipment condition before and/or after the maintenance work 210. The intelligent agent can then pass this maintenance data to the supply chain management system and the maintenance data can be added to the forecast data for the supply chain management system 211. An intelligent agent may also synchronize the maintenance data with the inventory supply data for allowing the supply chain management system to release products from the final staging points or reservation status for product previously reserved, but no longer needed 209.

Figure 2:
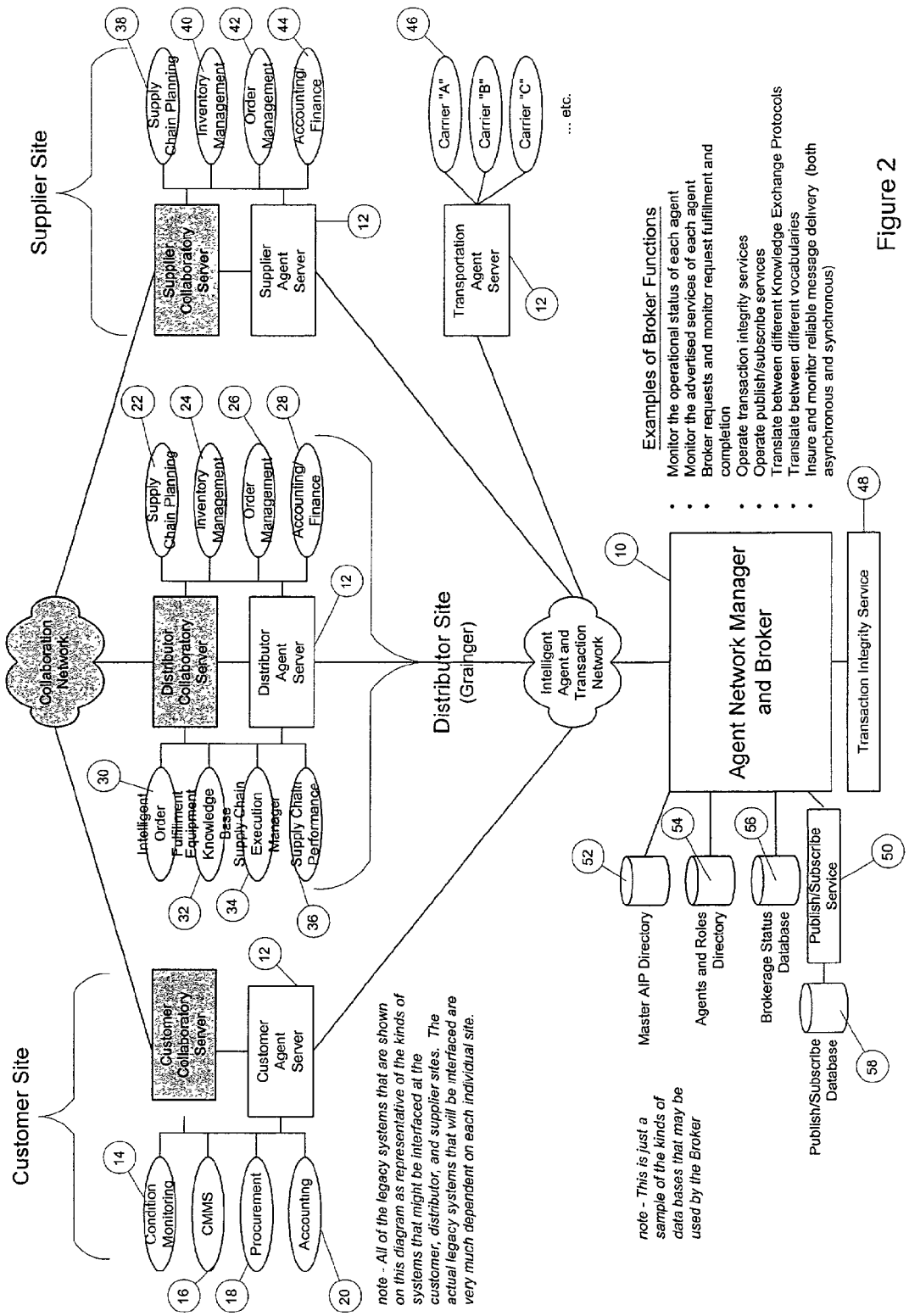
FIG. 2 is a diagram illustrating an exemplary network for use in providing integrated supply chain management.

Turning now to the comprehensive and reliable data communications network that serves as the foundation for the connectivity between the supply chain participants, the supply chain management system comprises a network of general purpose computing devices having computer executable instructions. An exemplary network is illustrated in FIG. 2 which illustrates exemplary general purpose computing devices at the customer site, the distributor site, the supplier site and the carrier site. Those of skill in the art will appreciate that the illustrated general purpose computing devices need not be limited to computers and servers but may include hand-held devices, multiprocessor systems, microprocessor-based or programmable consumer electronics, minicomputers, mainframe computers, and the like. Furthermore, the computer executable instructions may include routines, programs, objects, components, and/or data structures that perform particular tasks. Within the network, the computer executable instructions may reside on a single general purpose computing device or the tasks performed by the computer executable instructions may be distributed among a plurality of the general purpose computing devices.

For performing the tasks in accordance with the computer executable instructions, the general purpose computing devices preferably include one or more of a video adapter, a processing unit, a system memory, and a system bus that couples the video adapter and the system memory to the processing unit. The video adapter allows the computing devices to support a display, such as a cathode ray tube ("CRT"), a liquid crystal display ("LCD"), a flat screen monitor, a touch screen monitor or similar means for displaying textual and graphical data to a user. The display allows a user to view information related to the operation of the supply chain management system.

The system memory in the general purpose computing devices may include read only memory ("ROM") and/or random access memory ("RAM"). The general purpose computing devices may also include a hard disk drive for reading from and writing to a hard disk, a magnetic disk drive for reading from and writing to a magnetic disk, and/or an optical disk drive for reading from and writing to a removable optical disk. The hard disk drive, magnetic disk drive, and optical disk drive may be connected to the system bus by a hard disk drive interface, a magnetic disk drive interface, and an optical disk drive interface, respectively. The drives and their associated computer-readable media provide non-volatile storage of computer readable instructions, data structures, program modules and other data for the general purpose computing devices.

To connect the general purpose computing devices within the network, the general purpose computing devices may include a network interface or adapter. When used in a wide area network, such as the Internet, the general purpose computing devices typically include a modem or similar device which functions in the same manner as the network interface. The modem, which may be internal or external, may be connected to the system bus via an external port interface. It will be appreciated that the described network connections are exemplary and that other means of establishing a communications link between the general computing devices may be used. For example, the supply chain management system may also include a wireless access interface that receives and processes information from the general purpose computing devices via a wireless communications medium, such as, cellular communication technology, satellite communication technology, blue tooth technology, WAP technology, or similar means of wireless communication.

While the preferred network is the Internet because of its ubiquitous accessibility and cost advantages, there may situation where specific supply chain partners may choose to implement the network between them as a private network. Examples of private networks include, but are not limited to, virtual private networks ("VPNs") and electronic data interchange ("EDI") networks. In this regard, the description of the system which follows will support the use of both public and private networks.

To provide network security, the network may also utilize security techniques that have become customary when conducting electronic business. These security techniques include, but are not limited to, firewalls, encryption, authentication certificates, directory-based user registration and security management, etc. Because the capabilities and best practices of network communication security are constantly evolving and improving, this document does not espouse the use of any particular technique, technology or product. Rather, it simply specifies that the network architecture should support the use of security practices necessary to protect the business interests of the participants and to insure the overall integrity and confidentiality of the supply chain.

For exchanging information between the supply chain partners, the network preferably utilizes TCP/IP as the foundation communications protocol. Generally, HTTP and HTTPS are utilized on top of TCP/IP as the message transport envelope. These two protocols are able to deal with firewall technology better than other message management techniques. However, supply chain partners may choose to use a message-queuing system instead of HTTP and HTTPS if greater communications reliability is needed. An example of a message queuing system is IBM's MQ-Series or the Microsoft message queue (MSMQ). The system described hereinafter is suited for both HTTP/HTTPS, message-queuing systems, and other communications transport protocol technologies. Furthermore, depending on the differing business and technical requirements of the various supply chain partners, the physical network may embrace and utilize multiple communication protocol technologies.

For the purpose of providing a better understanding of the electronic data communications that preferably take place over the network, the network can be divided into two logical groupings, namely, the network for agent interaction and transaction passing and the network used for human-based intellectual and cognitive collaboration activities. Since collaboration involves different kinds of communication services that are frequently more synchronous in character than those of the transaction domain, the collaboration network has been differentiated from the agent/transaction network illustrated in FIG. 2. Examples of synchronous collaboration communications are the use of chat rooms, simultaneous use and maintenance of collaborative spreadsheets, blackboards, etc. It is to be nevertheless noted that the intelligent agent domain has a tight integration with the collaboration domain. In this regard, agents can monitor the collaboration activity and the collaborators can have access to the services and data/knowledge in the agent domain.

Focusing now on the intelligent agent network, the intelligent agent network is provided to connect the supply chain partners so that business transaction and agent messages can be exchanged throughout the supply chain. The intelligent agent network is controlled and managed by an Agent Network Manager and Broker 10 implemented on a general purpose computing device (hereinafter referred to as the "broker"). As illustrated in FIG. 2, the broker acts as a hub that links to the general purpose computing devices of the supply chain participants. All message traffic, whether it be agent messages or business transactions, is routed through the broker. As will be apparent from FIG. 2, the entire network is thus adapted to operate on a hub and spoke principle.

To perform the various pieces of the functionality that comprise the intelligent agent network, the system includes a collection of stationary agents. The stationary agents are hosted on agent servers 12, comprised of one or more general computing devices, that are positioned at the spokes of the network. Thus, an agent server is used at each of the customer, distributor, supplier and carrier spokes. The agent server is also used to interface with the legacy system of a supply chain partner. Stationary agents are preferred since the network environment between supply chain participants is typically very heterogeneous. Mobile agents (sometimes recommended by other researchers and practitioners in the area of distributed intelligent software agents) are best utilized in highly homogenous environments—a feature not anticipated in this supply chain scenario.

Figure 3:
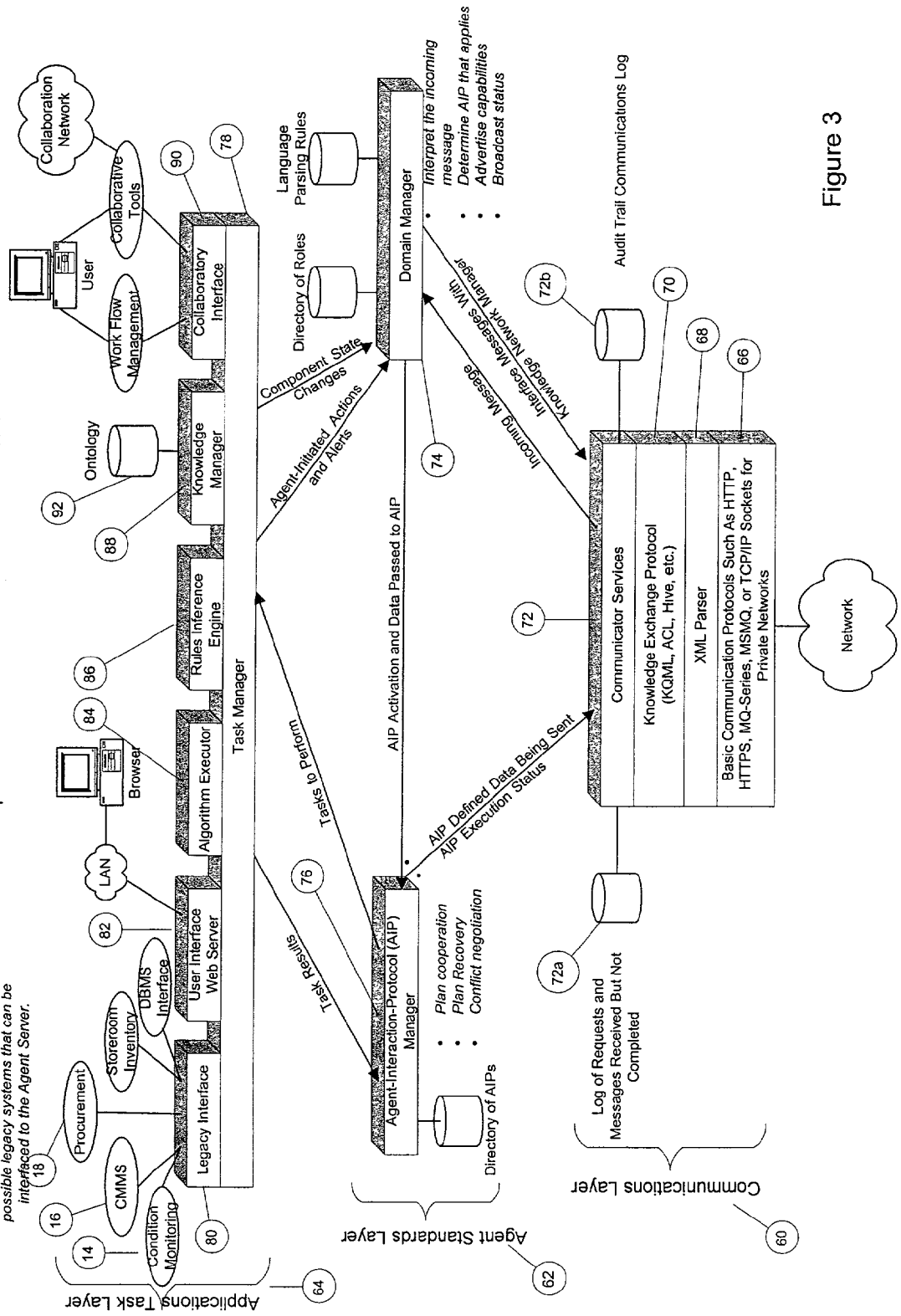
FIG. 3 is a diagram illustrating exemplary components at a customer site within the network illustrated in FIG. 2.

At the customer spoke of the hub, illustrated in FIG. 3 and on the left side of FIG. 2, an agent server may be utilized to interface and communicate with the following exemplary systems: condition monitoring system 14; computer maintenance management system ("CMMS") 16; procurement system 18; and/or accounting and financial settlement system 20. The condition monitoring system 14 monitors the condition of the customer's plant equipment and facilities to determine when failure may occur and when maintenance work should be created and performed. The CMMS or enterprise asset management system ("EAMS") 16 manages the maintenance work. The procurement system 18 (when not part of the CMMS) places purchase orders and manages the ordering process through product receipt. The accounting and financial settlement system 20 accounts for the customer's assets and inventory, and is used to pay invoices and handle the other aspects of financial settlement of business transactions.

Figure 4:
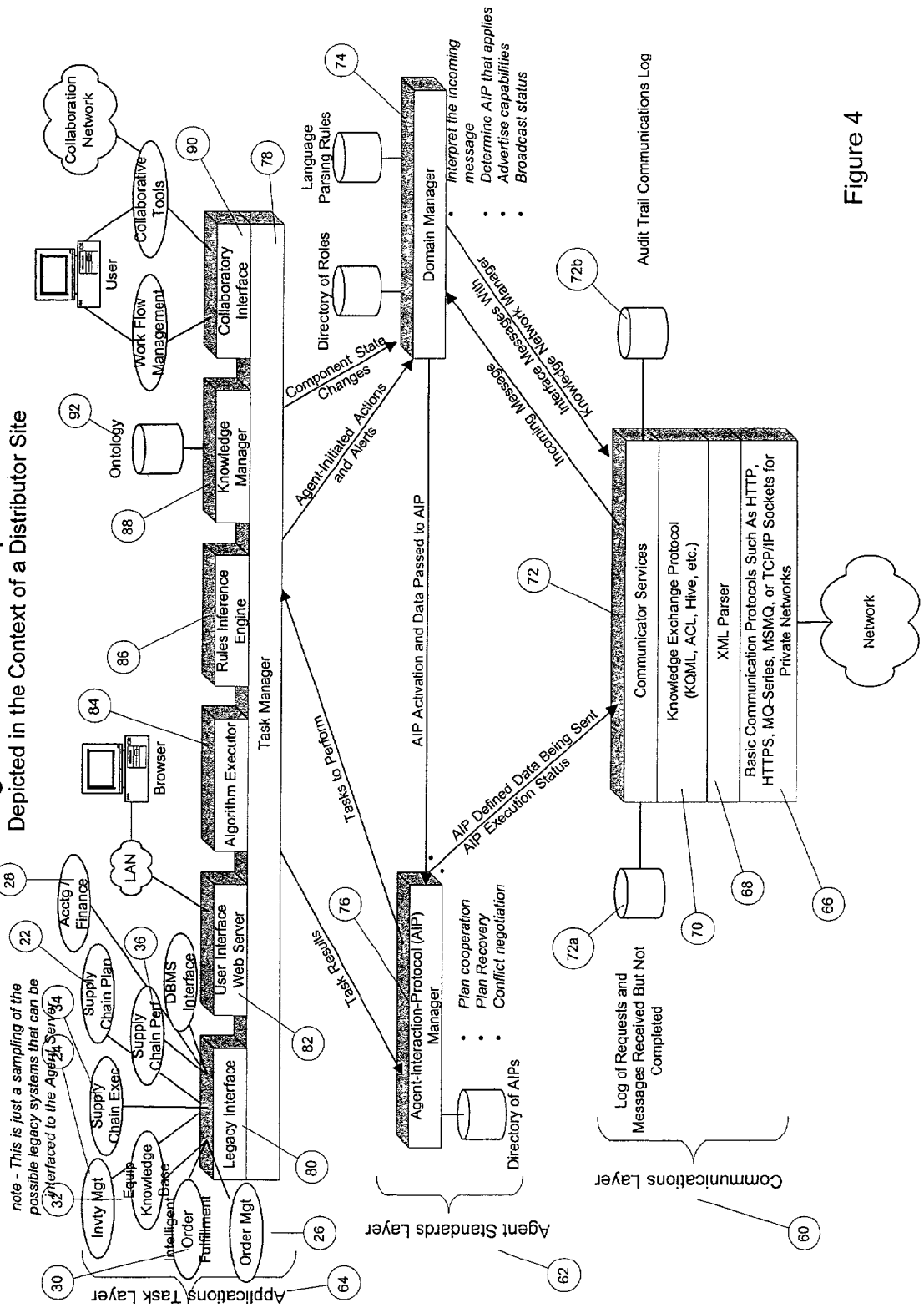
FIG. 4 is a diagram illustrating exemplary components at a distributor site within the network illustrated in FIG. 2.

At the distributor spoke of the hub, illustrated in FIG. 4 and in the center of FIG. 2, an agent server may be utilized to interface and communicate with the following exemplary systems: supply chain planning system 22; inventory management system/logistic management system 24; order management system 26; accounting and financial settlement system 28; intelligent order fulfillment system 30; Equipment Knowledge Base system 32; supply chain execution system 34; and supply chain performance system 36. The supply chain planning system 22 is used to plan the overall business of the supply chain from the distributor's perspective and is used to collaborate with the planning activities done by customers and suppliers. The order management system 26 accepts and processes customer orders. The intelligent order fulfillment system 30 determines the best fulfillment approach for customer orders and then manages the progress of fulfillment orders. The Equipment Knowledge Base system 32 maintains and operates the Equipment Knowledge Base required for dealing with uncertainties and probabilities of need for product in the supply chain. The supply chain execution system 34 monitors and manages the interactions over the supply chain with suppliers and customers to insure that the supply chain transactional processes are being performed correctly and timely. The supply chain performance system 36 monitors and evaluates the overall performance metrics of the supply chain.

Figure 5:
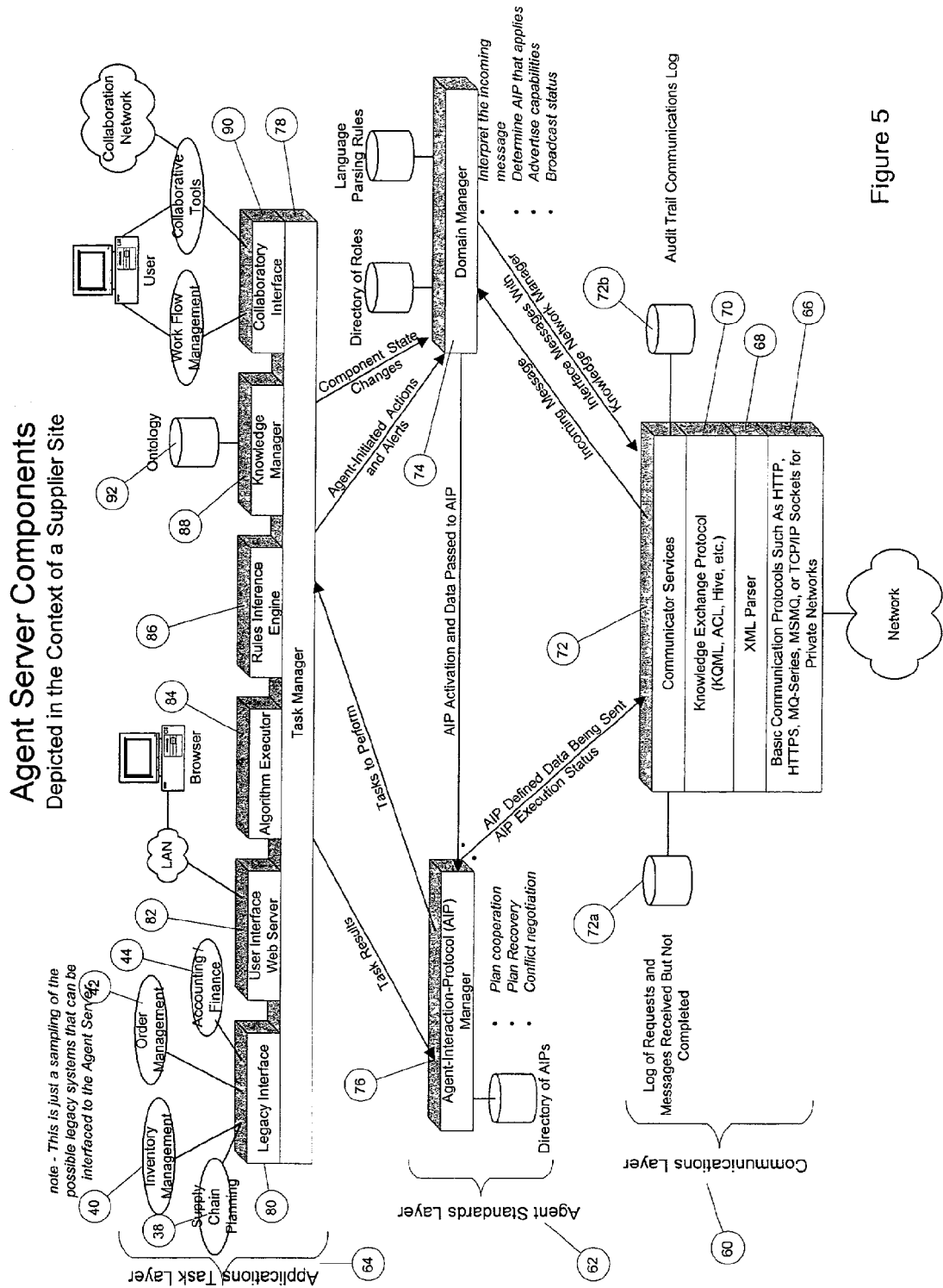
FIG. 5 is a diagram illustrating exemplary components at a supplier site within the network illustrated in FIG. 2.

At the supplier spoke of the hub, illustrated in FIG. 5 and on the right side of FIG. 2, an agent server may be utilized to interface and communicate with the following exemplary systems: supply chain planning system 38; inventory management system 40; order management system 42; and accounting and financial settlement system 44. The supply chain planning system 38 is used to anticipate product demand and subsequently schedule manufacturing/sourcing of products. The inventory management system 40 manages the finished goods and inventory. The order management system 42 accepts orders from the distributor and processes the orders.

As further illustrated in FIG. 2, an agent server may also be used to interface and communicate with the systems of the transport carriers. The primary purpose of this agent server is to receive shipping status. In this regard, it will be appreciated that suppliers and distributors typically have their own dedicated systems 46 which interface with the shipping carries to schedule shipments, create manifests, etc.

Turning now to the broker 10, the broker 10 is provided to monitor the operational status of each agent server 12 and the agent components on that server. The broker 10 monitors the services that each agent server and portfolio of agent components will advertise as being available from that spoke. This is used to partially determine the routing of various messages/requests and transactions. More particularly, agents of the agent servers 12 often will submit agent requests/messages and business transactions to the broker 10 that acts as an intermediary to handle the receipt of these messages and transactions from the original spoke to insure that the requests/messages and business transactions are routed to the appropriate destination(s). The broker 10 may also monitor the status of the request fulfillment and transaction completion.

The broker 10 will also operate the transaction integrity services 48. The transaction integrity services 48 may be referred to as "two-phase commit" services which insure that all hubs and associated systems process their respective portions of the business transaction completely and correctly before the transaction is considered to be complete. The transaction integrity services 48 also manage the "back out" of partially completed work on a transaction if the transaction is unable to be totally completed. This two-phase commit activity extends across all spokes involved in the completion of a business transaction.

Still further, the broker preferably operates a publish and subscribe service 50. In this regard, agents can both publish data and information to the network and ask to subscribe to the publishing events of certain kinds of data and information. Publish and subscribe services 50 are typically used to monitor status and states throughout the supply chain. An agent can subscribe to a type of information publishing event if the occurrence of that event will cause the agent to take a responsive or reactive action. On the other hand, an agent may publish information and data if that information and data is needed by other spokes to adjust or further process their work. Agents determine what type of information to publish and subscribe to based on directives programmed in the agent interaction protocol ("AIP") discussed later below.

The broker 10 may further function to translate between different knowledge exchange protocols. While it is preferred that the network used KQML as the primary protocol, some hubs may prefer or require the use of other protocols. Examples of other protocols include, but are not limited to, ACL, HIVE from MIT Media Lab, EDI, etc. By having this middleware function at the broker 10, there is no longer a requirement that both the sender and the receiver use the same protocols. Translation at the broker 10 may also occur between different vocabularies.

Still further, the broker 10 may be used to insure and monitor reliable message delivery (both synchronous and asynchronous) throughout the network. For example, if a particular spoke goes offline, the broker 10 will queue the message and transaction traffic for delivery when the spoke once again becomes operational. If a message gets garbled or corrupted during transmission, the broker 10 may re-transmit the message. If the message gets lost and never delivered, the broker 10 will re-transmit the message. Whenever re-transmission is done, it is preferred that the broker 10 insure that the message is delivered once and only once. In this capacity, the broker 10 works with its communication component counterpart at the spokes.

To perform the functions noted above, the broker 10 may utilize the following directories/databases: master API directory 52; agents and roles directory 54; brokerage status database 56; and publish/subscribe database 58. The master AIP directory 52 includes a listing of all of the major communication events that are supported over the network. The master AIP directory 52 also has the specific definition and specifications of content and actions associated with the sub-messages of each communications event. In this manner, a spoke may download the current version of the AIP if something has happened to the local AIP database at the spoke. The broker 10 also uses the AIP specifications to determine what has to be monitored and managed for each communication event from the perspective of the broker 10.

The agents and roles directory 54 lists all the agent servers and the components on those services. The agents and roles directory 54 also includes the roles and functions that the particular agent server 12 plays in the network. The broker 10 uses the agents and roles directory 54 to maintain the readiness status of each spoke and service on that spoke.

The brokerage status database 56 tracks the passing of messages and business transactions through the broker 10. As fulfillment or completion progress is made by the various spokes and communicated back to the broker 10, the broker 10 will record the changed state and status in the brokerage status database 56. When the message or business transaction is completed, the broker 10 may remove the entry from the brokerage status database 56 and place it into an archive audit/log database or file. The publish/subscribe database 58 tracks the current publishers and subscribers for each type of publishable within the network.

It is to be noted that, while not illustrated, the broker 10 can perform other functions. For example, the broker 10 can be used to perform maintenance utility functions that the systems administrator uses to maintain the various databases and parameter tables, the systems management functions that the system administrator uses to monitor and manage both the broker 10 and the overall state of the network, etc. Furthermore, it will be understood that many functions of the broker 10 can be implemented using commercially available application servers and frameworks.

As described above, agent servers 12 host the intelligent agents located on the network. The components that comprise the agent server 12 can be classified into three layers, namely, the communications layer 60, the agent standards layer 62 and applications tasks 64. These layers, in the context of a customer site, are illustrated in FIG. 3.

The communications layer 60 provides a means for connecting to the network. At its lowest level, the communications layer provides basic communications protocol services 66. In the public Internet environment, the basic communications protocol layer 66 services HTTP and HTTPS communications. These services may also be used to support communications over private networks, for example, networks using TCP/IP sockets.

Above the protocol services 66 the communications layer may include an XML parser 68. In this regard, in the preferred embodiment, all message and transaction traffic will use XML as its formatting standard. For incoming messages, the XML parser 68 unbundles the XML formatting so that the message can be handled in its constituent parts by the knowledge exchange protocol 70 and communicator services 72 layers. For outgoing messages, the XML parser 68 takes the outbound constituent parts and bundles them into a XML document. The XML document is then passed to the communications protocol services 66 for transmission to the hub/broker 10 and, ultimately, to the destination spoke.

Above the XML parser 68 is the knowledge exchange protocol services 70. The knowledge exchange protocol services 70 handle the mechanics of interchange between the agents and provide control coordination with their counterparts on the hub and other spokes. The knowledge exchange protocol services 70 function by handling housekeeping chores, determining what kind of exchange conversation is taking place and what needs to be done to handle the conversation, and unbundling of the actual content of messages. By way of example, several knowledge exchange protocols can be used such as KQML, ACL, and Hive. Any one agent server will use only one of these protocols. Since KQML is the preferred protocol, the remainder of the description is directed to an embodiment utilizing KQML.

The communicator services 72 is a very thin layer that resides on top of the overall communications layer 60. The communicator services 72 log all messages received but not completed in a database 72a. If message completion is not acknowledged within a designated period of time, the communicator services 72 will query the higher levels of the agent server to determine what may have gone wrong in the processing of the message. The communicator services 72 also maintain the audit trail of completed message traffic in a database 72b.

Turning now to the agent standards layer 62, the agent standards layer is provided to insure that all of the prescribed messaging and communication standards are being followed. To this end, the agent standards layer 62 is comprised of two parts, namely, the domain manager 74 and the AIP manager 76. The domain manager 74 is used to take the content and message types from the knowledge exchange protocol messages and determine exactly what needs to be done with the content. To determine the content, the domain manager 74 first parses the message according to the grammar and syntax of the language being used. If the message is a sub-message which is part of a conversation stream already in progress, the domain manager 74 passes the parsed content to the AIP manager 76 indicating to which AIP in progress and what sub-message the content belongs. If, on the other hand, the message is the start of a new conversation, the domain manager 74 determines what server role is involved and what AIP should be activated. The domain manager 74 may then instruct the AIP manager 76 to start a new conversation sequence for that message and role.

By way of example, if one of the application task agents at the spoke needs to initiate communications with some other spoke in the network, then the particular application task agent will send an initiation request together with the appropriate data to the domain manager 74. The domain manager 74 can then determine which AIP is involved and have the AIP manager 76 initiate the appropriate conversation. This procedure can be repeated when there are state change alerts at a spoke that need to be communicated to other spokes in the network.

The domain manager 74 also functions to respond to queries from the broker 10 regarding what roles and services are offered at the spoke on which it resides. The domain manager 74 can advertise the services and roles that are active on the agent server 12. It can also monitor the operational status of the various application task agents and inform the broker of any changes in availability of those services.

The agent interaction protocol or AIP manager 76 manages the conversation units between the spoke on which it resides and other spokes on the network. Each logical conversation unit (also called a "major communication") is usually comprised of several sub-messages that are passed back and forth between conversing spokes. The AIP manager 76 directs the activity that is prescribed for the spoke and monitors the progress of the overall conversation. If a sub-message is overdue from some other spoke, the AIP manager 76 can initiate a query to the AIP manager at the other spoke to determine why the delay is taking place. AIPs are described in greater detail below.

To perform according to the tasks that are prescribed in the AIP specifications for the conversation type, the AIP manager 76 dispatches messages to the appropriate application task agents. When the application task agents complete their assigned tasks, the AIP manager 76 determines if other work needs to be done at this spoke and dispatches the appropriate tasks. If the work is done for the current sub-message, the AIP manager 76 associates the task results with the correct AIP conversation in progress and passes it to the communications layer 60 for transmittal over the network to the destination spoke. If this represents the final step or sub-message for a particular AIP conversation, the AIP manager 76 will inform the communication layer 60 to log the overall conversation message as complete and to add it to the audit trail communications log 72b.

The AIP manager 76 also plans recovery from system or network outages and other systems problems that may occur either locally or across the network. For example, because the total supply chain system is dependent on the operations of a highly distributed network of agents and other software components that frequently utilize intelligent techniques such as rules inference engines, heuristics, and other intelligent algorithms, conflicts can arise between these agents. When such conflicts arise, the AIP manager 76 will have communication types specifically designed to negotiate solutions and resolutions to these problems and then implement the steps needed to once again get the entire supply chain functioning smoothly.

Turning to the task manager layer 64, the task manager 78 is responsible for insuring that non-continuous agents are started when needed and stopped when not needed. The task manager 78 also manages the system resources needed for all the agents and generally controls the systems mechanics of what is happening when tasks are being executed. It is also the task manager 78 that reports state changes to the domain manager 74. Still further, if one application task agent needs the services of a second agent, the request is made through the task manager 78. In this situation, the task manager 78 insures that the data is correctly passed back and forth between the agents.

As illustrated in FIG. 3, the individual application task agents can be classified according to the type of services they perform at the spoke. Any given agent may embrace multiple types of services. By way of example, a taxonomy sometimes used in the software agent research community defines application task agents as follows:

information agents which locate information sources, extract information from those sources, provide necessary filtering of the information for relevance, and prepare the resulting information for return to the requester.

integration agents which work in the other direction from information agents in that they receive information and data from outside the spoke and add it to the appropriate legacy system or database at the spoke.

cooperation agents which take plans created by planning agents and then direct the task manager 78 to engage the appropriate agents to accomplish the task steps. If the solution involves interacting and requesting services from another spoke, the cooperation agent will determine what needs to be done and dispatch a request to the broker 10. The broker 10 may then figure out the appropriate responding or cooperating spoke and engage its services.

planning agents which develop plans and strategies. The planning agents plan out complex tasks that do not have a pre-defined execution path or AIP defined. An example of a planning agent would be at the customer site. If a shipment or a critical repair part is delayed significantly to completely ruin a maintenance schedule, the planning agent will first determine how to define an alternative sourcing for the part and what corrective actions need to be done with the maintenance scheduling and execution work. To this end, the planning agent may engage the cooperation agent to initiate the corrective work as this may involve the cooperation between several spokes on the network.

transaction agents which handle business transaction data, usually acting as interfaces to the site's legacy application systems.

believability agents which are basically simulators that will test certain suggested plans or hypotheses. Within an MRO supply chain environment, these agents are likely to be hosted by the distributor's site/spoke, but can be accessed and utilized by other partner spokes.

assistance agents which serve as personal assistants to humans. These agents help to locate and retrieve information, provide performance support assistance, and provide other human interface services such as the maintenance application services to maintain ontology files.

anticipation agents which serve to monitor situations and anticipate developing problems.

Most application task agents will be developed and supported by the company or organization that is sponsoring and operating the supply chain to insure that there is as much consistency as possible across the entire network. In many cases, this will be the distributor. However, there may be situations where those agents that interface to legacy systems will be written by either the spoke company or by the software vendor supporting the legacy system.

By way of further example, FIG. 3 illustrates the various applications/services supported by the application task layer 64 that may be found at a customer spoke. These applications/services include, but are not limited to, the following: legacy interface agents 80; user interface agents 82; algorithms executor agents 84; rules inference engine 86; knowledge manager 88; and collaboratory interface 90. The legacy interface agents 80 function to integrate a legacy system (e.g., CMMS 16) into the supply chain network. Preferably, for each legacy system there is one legacy interface agent 80. Legacy interface agents 80 are classified as information, integration and/or transaction agents.

The user interface agents 82 may be servlets, scripts, or CGI programs running on a web server. The user interface agents 82 interact with the environment using web technology and browsers and provide users with the status of certain events and transactions. The user interface agents 82 also allow parts of the ontology 92 to be changed and otherwise maintained. Local system managers will use the user interface agents 82 to query the domain manager 74 to determine the operational status of the various components of the agent server 12. User interface agents 82 are classified as assistance agents.

The algorithm executor agents 84 perform all kinds of analysis, synthesis, and evaluation. The algorithm executor agents 84 are classified as planning agents, cooperation agents, believability agents, and/or anticipation agents. Assistance agents that perform support routines will also be algorithm executor agents 84.

The rules inference engine 86 is used whenever decisions need to be made that follow rules and policies documented in rules files contained in the ontology 92. All of the other agents can use the services of the rules inference engine 86. The other agents will also likely be asked to contribute data to queries by the rules inference engine 86.

The knowledge manager 88 maintains the ontology 92. The ontology 92 maintains all of the knowledge that the agents act upon. The other task agents will likely both query and update the ontology 92 using the functional services of the knowledge manager 88.

The collaboratory interface 90 consists of several types of agents. If other task agents need to involve a user, the collaboratory interface 90 is used to make entries into and get results out of the workflow management system. For example, a revised sourcing and fulfillment plan might cause the price of the repair parts to exceed an approval threshold and require that an entry be placed in the workflow system to have the new plan approved. The appropriate information is packaged as a business process event and submitted to the workflow management system. The workflow management system routes the package to the appropriate people for approval or disapproval and returns the decisions to the collaboratory interface 90. The collaboratory interface 90 will pass the decision results to the initiating agent for continued processing.

Another purpose of the collaboratory interface 90 is to enable the actual software tools used in collaboration to interact with the agent server 12. The collaborators may want to query areas of the ontology 92, or the collaborators may want to use believability agents to run a simulation. Finally, the collaboratory interface 90 allows an anticipation agent to monitor the well-being or health of the collaboration itself by monitoring and analyzing collaboration activity taking place.

At the supplier spokes, shown in FIG. 5, the portfolio of applications tasks would be relatively smaller than at the customer spoke. In this regard, the supplier spoke would have legacy interface agents 80 for interacting with the supplier's supply chain planning/forecasting systems 38, the inventory management systems 40, the order management systems 42, accounting/finance systems 44, etc. Suppliers may request a limited user interface Web server 82 to give them visibility into the status and operation of the agent server 12. Algorithm executor agents 84 and the rules inference engine 86 may be used by those suppliers who want to develop a sophisticated involvement in the supply chain operation. The ontology 92 for the supplier site will be more limited than that at the customer site. Furthermore, whether or not the supplier has a collaboratory interface 90 will depend on the degree to which the supplier wishes to truly collaborate within the supply chain.

At the transportation spoke, legacy interface agents 80 will be used to interface to the various carrier's systems 46. A small ontology 92 may be provided to record which shipments should be tracked for status reporting. A cooperation agent may be provided to periodically query the shipper's systems to obtain the status and to publish the status on the network so that the distributor and customer spokes can be advised of status. There may also be a basic anticipation agent executor that uses the rules interface engine 86 to anticipate major transportation problems that could be developing based on the status that is being currently received.

At the distributor spoke, shown in FIG. 4, all of the same kinds of application task agents found at the customer site will be present. Types of legacy systems that may require interfacing include supply chain planning 22, inventory management 24, order management 26, accounting/finance 28, intelligent order fulfillment 30, the equipment knowledge base 32, the supply chain execution manager 34, and the supply chain performance system 36. There will be more algorithm executor agents 84 at the distributor spoke than elsewhere in the network since the distributor will have much more to accomplish in coordinating the happenings between the supplier and customer.

As discussed above, the preferred knowledge exchange protocol used is the Knowledge and Query Manipulation Language or KQML. KQML is the result of a research project sponsored by DARPA. A KQML web site is maintained by the University of Maryland Baltimore County (http://www.cs.umbc.edu/kqml/) and contains detailed descriptive information as well as case studies of its use. In particular, the web site includes the current detailed specification of KQML.

KQML defines both a message format and a message handling system for multi-agent systems. The message transmission definitions are virtual. Instead of defining a particular technical standard for implementing message transport, KQML defines a model of the services that the message transport system performs. The KQML message transmission definitions are incorporated and modified as needed in the communications layer 60 of the agent server 12. KQML covers identification, connection establishment, and message exchange. KQML does not cover the semantic content of the message. Rather, the semantic content can be expressed in any knowledge language which is then placed in a KQML envelope. Examples of knowledge languages are the knowledge interchange format (KIF), conceptual knowledge markup language (CKML), traditional programming languages such as Lisp and PROLOG, declarative languages such as SQL, etc. Essentially, any language can be used so long as the language representations are sequential and that sentences have encoding as an ASCII string so that they can be embedded in the KQML message.

KQML is built around a set of performatives. A performative is a fundamental action that one agent can request another agent to perform. The definition of performatives is open-ended in KQML. Implementers can add specialized new performatives as long as the parameters and syntax comply with the KQML specifications. When used in connection with a MRO supply chain an additional group of performatives be added that can be called "Business Transaction Performatives." This new group allows business transactions to be handled over the agent network as well as agent message traffic and also allows the agents to interface with and become involved with the business transactions. Examples of Business Transaction Performatives are:

Trigger-Event—the recipient is receiving a business transaction that it should process but is not subject to transaction semantics (two-phase commit)

Start-Transaction—the recipient is receiving a business transaction that it should process and the transaction is subject to transaction semantics Add-Event—the recipient is receiving another transaction in the set or series embraced in the currently active Start-Transaction Commit-Transaction—All agents have successfully processed the transaction events in the logical Start-Transaction set and can now commit and all agents can now commit their results Abort-Transaction—the sender is unable to successfully process a transaction event in the current Start-Transaction series and therefore all agents participating in the currently active Start-Transaction set should abort their efforts and back-out any results already completed Each performative has a series of parameters identified by keywords. A new performative parameter may be added to the standard parameters defined in KQML to specify the name of the AIP that specifies the steps to follow in executing the performative. This is the ":aip<word>" parameter.

Figure 6:
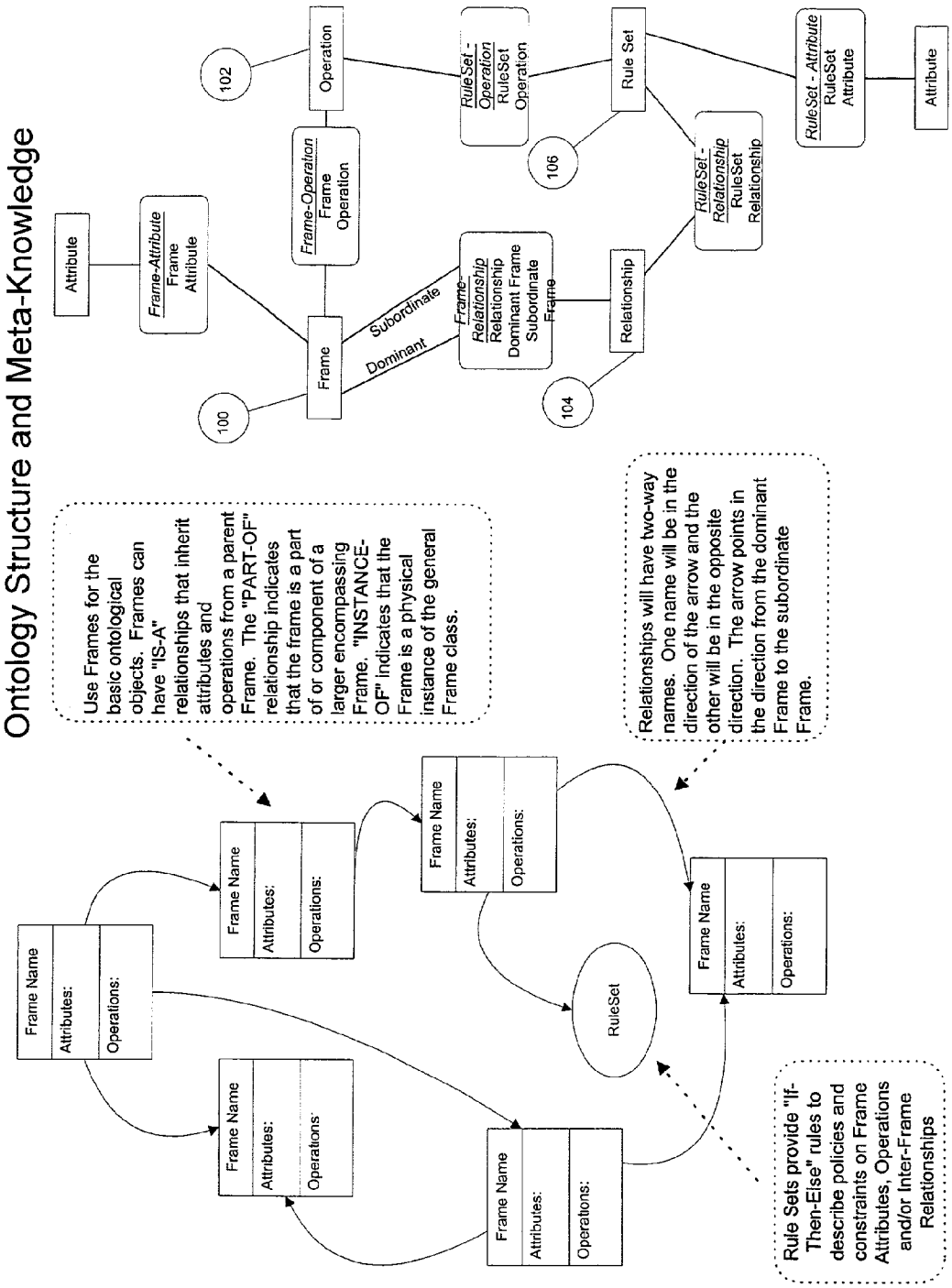
FIG. 6 is a diagram illustrating an exemplary ontology and meta-knowledge structures.

Turning to the ontology 92, illustrated in FIG. 6, the ontology 92 is a description of concepts and relationships that can exist for a community of agents. The ontology 92 exists for the purpose of knowledge sharing and knowledge reuse. Each agent server 12 will have its own ontology 92 which may be physically implemented using a database management system. In this manner, there will be a series of programs, e.g., embodied in the knowledge manager 88, to drive the maintenance and querying of the ontology 92.

The ontology 92 represents the concepts, relationships, and knowledge of the supply chain with declarative formalism as illustrated on the left hand side of FIG. 6. Frames 100 are used to represent the basic concepts with the ontology 92. A frame 100 is an object-oriented analysis/design technique that documents an object together with its attributes and operations. Many ontologies simply use plain nodes in the semantic networks. By using frames 100 as the nodes in the semantic network, attributes in a structured data context can be included in the ontology 92 rather than having to represent each attribute as another node-relationship construct. Furthermore, using an object-oriented framework permits a hierarchy of concepts where child concepts can inherit the attributes and operations of the parent concept. The ability to provide inheritance eliminates the need for substantial amounts or redundancy in the physical implementation of the ontology database 92.

The frame construct also allows operations 102 to be associated with the node concepts. Operations 102 will be used for several purposes. First, some aspects of the ontology database will actually replicate data in the databases of the legacy systems. In these situations, rather than duplicate the data in the ontology 92, an operation 102 will contain the SQL and other access methods/procedures to access and maintain this data in the legacy system databases. An agent may query a part of the ontology and think it is getting the data directly from the ontology 92 when, in reality, the ontology database is simply pointing to the real database in the legacy system domain.

The operations 102 in the frames 100 are used to direct the employment of other application task agents. In this way, the ontology 92 not only records relationships 104 between concepts, but actually records processes that the concepts themselves use or are used by other applications in better understanding of the concepts. The operations 102 can also be used to serve as database triggers to cause certain agent and business transaction events to be triggered whenever certain types of ontology maintenance takes place against concepts.

Since frames 100 can represent just about any kind of concept, the ontology can be logically (and sometimes physically) divided into partitions that represent particular subject areas. It is these subject areas that are referenced by the ":ontology" parameter in the KQML performatives. These is a base set of subject areas that is defined by the sponsor/operator of the supply chain, usually the distributor, that will be common across the entire supply chain. This will enable a base level of semantic consistency among the community of agents in the supply chain. However, since each agent server 12 can add its own subject areas as the need arises, the artificial intelligence community has established techniques for one ontology server 92 to describe these new subjects in its semantic network to other agent servers 12 so that some degree of automatic discovery can take place to thereby eliminate confusion caused when one set of agents does not understand the semantic implications of a foreign ontology being used by cooperating agents.

As noted, frames 100 are related to each other through relationships 104. Every relationship 104 will have a dominant frame and a subordinate frame. The relationship 104 will have a descriptive name for each direction. For example, in an inheritance relationship, the dominant frame is the parent concept and the subordinate frame is the child concept. The relationship is named "has-a-kind-of" in the direction of dominant to subordinate and the name of "is-a" in the direction of subordinate to dominant. Accordingly, a parent "has-a-kind-of" concept for a child and the child "is-a" parent.

Likewise, if a frame 100 is composed of sub-frames, the "part-of" relationship is used. In this regard, "part-of" is the name from the subordinate to the dominant and "has-component-of" is the name in the direction of dominant to subordinate. If a dominant frame represents the entire class of concepts and the subordinate frame represents a single instance of that class, the "instance-of"/"has-instance-of" relationship is used.

The semantic network in the ontology 92 also includes rules sets 106 that are used by the rules inference engine 86. Rule sets 106 are collections of "if-then-else" rules used to control decision making and to enforce business policies. Rule sets 106 also have relationships with concept frames which basically indicate that the rules pertain to the concept embodied in the frame. Generally, some operation in a concept frame will trigger the running of an algorithm executor agent 84. The algorithm executor agent 84, in turn, may need to do some decision making that requires using the rules inference engine 86. The algorithm executor agent 84 will retrieve the applicable rule set from the ontology 92 by finding the rule set 106 related to the target concept frame 100. The executor agent 84 will direct the rules inference engine 86 to retrieve the rule set 106 from the ontology 92, perform the inference, and modify the ontology 92 based on the results of the inference. The executor agent 84 will subsequently learn about the outcome of the inference by querying the ontology 92. Based on the outcome of this query, the executor agent 84 will branch it processing logic accordingly.

Knowledge and understanding are achieved by the agents by traversing the ontology 92 from concept frame to concept frame over the relationship connections. For example, in order to answer a query "will the widget on equipment XYZ fail in the next four weeks?" an information agent will respond to an "evaluation" performative. The AIP will first tell the information agent to attempt to find the concept frame 100 for equipment XYZ and its "part-of-component" frame for the widget. It will then navigate around those two target frames to determine if there are any relationship paths to other concept frames 100 that indicate possible causes of wear/tear and failure of the widget. It will then navigate around the target frames to search out any relationship paths to concept frames 100 that indicate the presence or absence of these potential causes. If potential causes are evident, then further relationship navigation is done to determine the severity or potential likelihood of a failure. Eventually, the evaluation agent will compile enough knowledge and understanding from the ontology to reply with a "yes" or "no" to the question and provide some sort of confidence metric in the reply. If no answer can be determined from the ontology 92, then the information agent can generate a reply indicative of this condition.

Like any other database, the ontology 92 will have a meta-knowledge section that describes the schema of frames, attributes, operations, relationships, and rule sets and the permitted pairings of these. The meta-knowledge section is illustrated on the right hand side of FIG. 6. The supply chain sponsor/operator will provide the core set of meta-knowledge so that there is a consistent semantic set foundation across the entire supply chain. Besides populating the ontology 92 with specific instances of meta-knowledge components, the agent server 12 can also extend the ontology schema by making local additions to the meta-knowledge and then populating instances of those additions.

The supply chain partner should also provide a core set of AIPs which, among other execution directives, define what kind of relationship names to use in different performative actions and what kinds of relationship names to create when creating new relationships. Therefore, the real semantic definition of relationships is inherent in the AIPs since the AIPs are determining how the concept frames and relationships are being used and interpreted by the various application task agents.

In a preferred embodiment, the agent interactive protocol or AIP is patterned after the RosettaNet Partner Interface Process or PIP. The PIP depicts the activities, decisions and partner role interactions that fulfill a business transaction between two partners in the supply chain. PIPs are explained in detail on the RosettaNet web site: http://www.rosettanet.org/.

The AIP builds on the PIP implementation and is a more detailed and expanded concept specifically designed to coordinate the execution of various agent tasks within a single agent server 12 as well as coordinating the communications between agents across the entire supply chain network. Whereas the RosettaNet PIP embraces only business transactions, the subject AIP is extended to embrace agent interaction as well as business transactions. The AIP defines major interaction roles for the entire agent server 12.

More specifically, the AIP specifies overall sets of activities that each agent server/spoke 12 must execute before an interaction can be considered to be complete. To this end, the AIP specifies a set of sub-roles that are local to the agent server 12. Each sub-role is assigned to be the responsibility of one or more of the application task agents. There are start and end states defined for each of these sub-roles. There are task activities specified that each responsible task agent must execute to complete the sub-role. There is also a specification of the input and output message content. There is a set of task activity performance controls for the sub-roles that are comparable to the business activity performance controls in the PIP. Where the PIP only covers interactions between supply chain partners, the AIP covers local interactions between the activity task agents within an agent server 12 as well as the interactions between different agent servers 12.

The definition of the task activities in the AIP can, at times, be very granular and detailed. The various task agents are provided with instructions and processes on how to complete their assigned responsibilities. This also includes directives regarding how to use and update the ontology 92. To this particular end, the AIP encapsulates the actual semantic interpretation of the ontology 92 because it specifies how the agents are to use and update the ontology 92. This includes a specification of how to create and assign relationship names between concept frames. Thus, the AIP provides direction to the agents as to what concepts and relationships to look for in the ontology 92 and what rule sets 106 to use in making decisions.

To insure that all participating agent servers 12 are executing coordinated and synergized roles to complete performatives, every performative that comes across the supply chain network will have a particular AIP assigned to it. This annotation on the performative will include the type of AIP, the acutal AIP instance identification, and the particular sub-role and activity step for which the performative is the input or output message. This allows the receiving agent server 12 to immediately pick up the processing of the task activities for the AIP in progress at the correct place in the entire AIP execution script when a performative is received.

Another feature of the AIP is that there are circumstances when it is not possible to predetermine exactly how many exchanges of intermediate conversations between the various agents will take place. Sometimes there are many iterations of intermediate communications until some conclusion is reached between cooperating agents. For this situation, the AIP has an activity definition construct that specifies an iterative loop to take place until some condition is met (equivalent to the programming constructs of "while <condition> do <activity>" or "do <activity> until <condition>").

To maintain the various pieces of the AIP, including the specification of task activities, technicians can use the user interface Web server 82 in the application task layer 64 of the agent server 12. This can be done in order to support site-unique processing steps and policies.

For managing order fulfillment within the supply chain network, the system includes agents for intelligently selecting a fulfillment plan. Determination of the fulfillment plan balances the requirements of staging the product according to the customer's level of service specification against the possibility that the customer will end up not needing the product. If the product is not needed, the distributor may end up with the product which has very little overall demand being inventoried at a point where handling and transportation costs to reposition the product to a location which has more overall demand will totally consume the distributor's gross margin on that product. Therefore, the planning method should seek to economically stage the product to comply with the level of service requirements while selecting a staging point that is economically feasible for the distributor given the probabilities of need and the expectation of future, near term demand.

Figure 7:
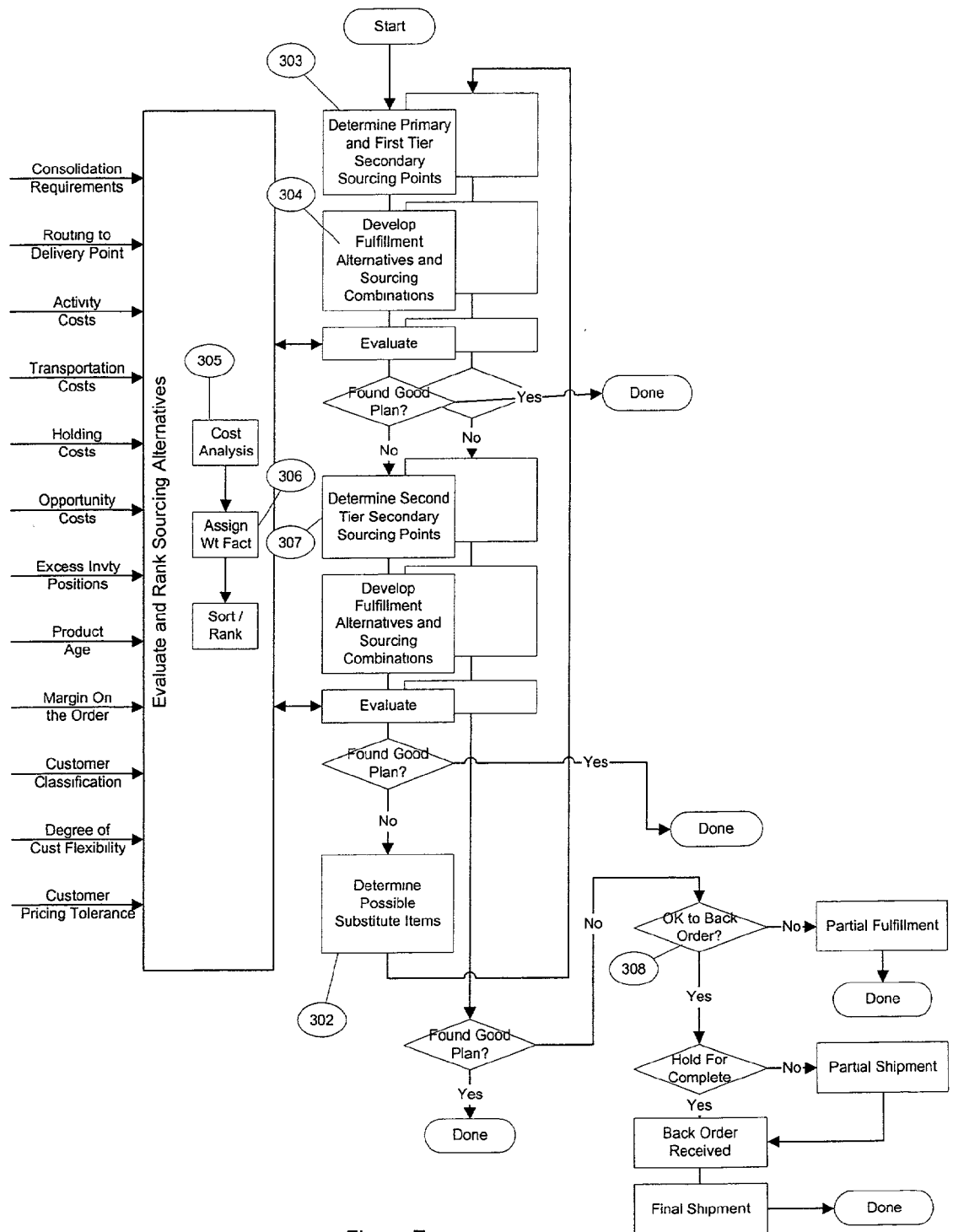
FIG. 7 is a diagram illustrating an exemplary process for intelligent order fulfillment planning.

To this end, as illustrated in FIG. 7, the agents generally function by constructing a list of alternative plans to fulfill the order, for grading and ranking the constructed alternative plans, and for selecting one or more of the plans for use in fulfilling the order. In this regard, the system contemplates fulfillment plans for the following levels of service (LOS):

delivery to the customer's maintenance site;
delivery to the customer's storeroom/tool crib;
staging at a distributor branch for short-notice will-call pickup;
staging at a distributor distribution center for overnight shipment to the customer;
staging at a distributor distribution center for lower priority shipment to the customer to replenish customer safety stock inventory if the customer had to use inventory in the maintenance task covered by an advance demand notice; and
staging for direct shipment from a manufacturer/supplier for lower priority shipment to customer to replenish customer safety stock inventory if the customer had to use inventory in the maintenance task covered by an advance demand notice.

It is to be understood that these levels of service are exemplary only and are not meant to be limiting. It is also to be understood that the steps of the fulfillment planning process can be applied to all orders received by the distributor including speed and convenience orders for unplanned purchases having a 100% probability of need, planned advance demand notice (level of service) purchases with both certain (100% probability of) need and uncertain (less than 100% probability of) need. In this way, the same inventory base and logistics capabilities throughout the supply chain can be used for all orders and there is no need for the distributors to have separately managed inventories for each type of order or business model.

Figure 13:
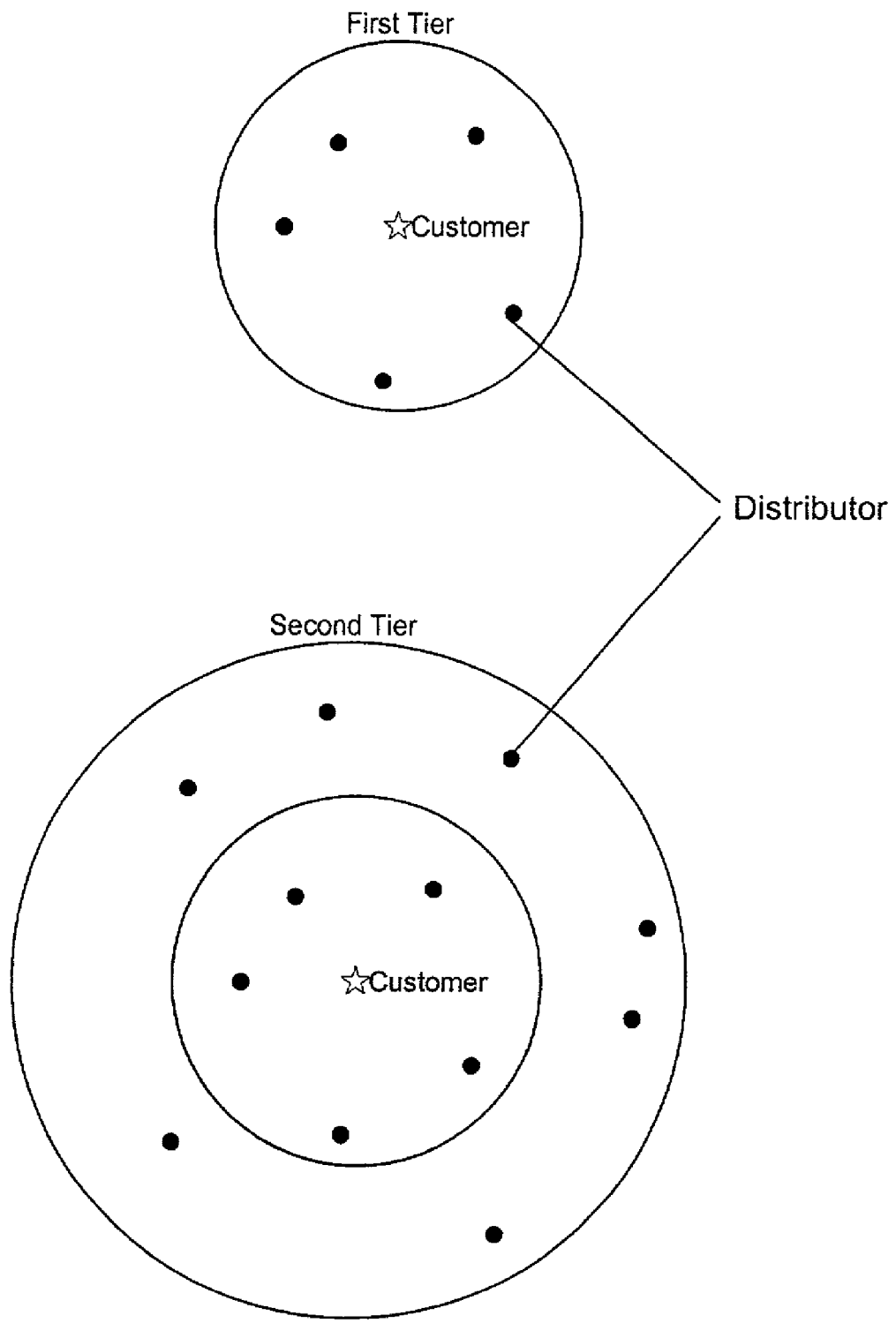
FIG. 13 illustrates an exemplary n-tier distribution network within a supply chain.

For use in determining candidate sourcing points for each line item of the order, the agents employ a branch and bound technique. This approach is desirable as it reduces the number of alternatives that might otherwise be considered using every combination and permutation of sourcing points throughout the logistics network. The branch and bound approach is implemented by selecting tiers of sourcing points in a n-tier logistics network generally illustrated in FIG. 13. In an n-tier logistics network there are at least two levels of distribution or order fulfillment points between the supplier and the customer. Each distribution point or fulfillment point is designated as to whether it is replenished by a higher tier point in the network or directly by the supplier (both options are allowed for a given distribution point) and whether it fulfills customer orders or replenishment orders for a lower tier point in the network (both options are allowed for a given distribution point).

The criteria for defining each tier depends on the specific logistics network topology that is being used. Therefore a table and parameter driven approach is used to define these tiers and how to assign sourcing points to each tier. By maximizing the use of parameter tables and rules, the basic intelligent fulfillment planning process can be used in any kind of logistics network topology. This is desirable as the system can be adapted quickly without major programming activity as a company changes its logistics network topology to respond to changes in business activity and sales patterns.

To proceed with the intelligent order fulfillment planning procedure, the system utilizes some or all of the data contained in an electronically transmitted order, i.e., an order generated at the customer spoke/distributor spoke and issued to the distributor spoke for fulfillment. The data contained in the electronically transmitted order preferably includes, but is not limited to, the following:

type of order (e.g., walk-in, will-call, ship, advance demand notice reserve);
point of delivery;

code for the supplier branch that normally services this customer's site;

customer's end-delivery site ZIP code;

delivery date;

whether or not the customer requires a single consolidated shipment or whether the customer will accept multiple split shipments;

supplier stock number for each line item in the order;

quantity ordered for each line item in the order; and any supplier diversity requirements for the line items.

For advance demand notice orders the point of delivery (i.e., level of service) should be specified as the customer's delivery site designated by the ZIP code or the code of the distributor facility where the advanced demand notice is to be staged per the level of service agreement. For walk-in and will-call orders, the point of delivery should be specified by the code for the distributor branch that normally services this customer's site. For ship orders, the point of delivery should be specified by the code for the distributor distribution center that supports the customer's normal branch. Furthermore, for advance demand notice orders, the date should specify the date on which the product(s) is/are to be staged at the level of service or "LOS" point. For ship orders and will-call orders the date should specify the date the customer wants the product either shipped or at the will-call counter and, for walk-in orders, the date should specify the current date.

To further facilitate the intelligent order fulfillment planning procedure, for each line item within an order the agents may determine if the distributor has access to any equivalent products 302. In this regard, an equivalent product can be a product that has the same functions and/or features as a specified product. Preferably, the equivalency of functions and features is determined as a function of product definitions provided by the distributor. It is further desired that, if there are any supplier diversity requirements specified by the customer, these requirements will be taken into account when looking for equivalents.

In accordance with the procedure for determining fulfillment plan alternatives, illustrated in FIG. 7, once an order is received, the agents determine primary and tier one secondary sourcing points for each line item in the order 303. The primary and tier one secondary sourcing points are determined by the agents at the distributor spoke using information maintained within the ontology database 92 (either directly or by reference to legacy databases) which includes information indicative of the location(s) for the various items capable of being acquired through the distributor. The ontology 92 may also include listings of distributor branches that are assigned to customers and distributor distribution centers that are assigned to distributor branches. Preferably, both primary and tier one secondary sourcing points are assigned to each line item using the information in the ontology 92 and information extracted from the electronic order.

For determining the primary sourcing point for an item, the information in the ontology 92 and the type of order specified in the electronic order is utilized in a rules-based analysis by the agents. For example, a primary sourcing point may be the distributor branch that would normally service the customer's delivery site when a will-call order is specified, the distributor branch that is placing a walk-in order, the distributor distribution center assigned to the customer site's normal branch when a ship-to order is specified, or the distributor distribution center assigned to the customer site from which an advanced demand notice item is shipped for staging at the customer's site. When determining the primary sourcing point of line items, it will be appreciated by those of skill in the art that, in a supply chain, certain items may be stocked only at a distributor's national distribution center. For these items the designated primary sourcing point would be the national distribution center. Similarly, other items may only be shipped direct drop. In such a case, the fulfillment plans for those items would be limited to the drop ship process.

To determine the tier one secondary sourcing points, the information in the ontology 92, the type of order specified in the electronic order, and the primary sourcing point for the line item is preferably utilized in the rules-based analysis. For example, for walk-in and will-call orders, the tier one secondary sourcing points may be other distributor branches (i.e., other than the branch selected as the primary sourcing point) within a given mile radius (e.g., 25 miles) of the primary sourcing point. When the primary sourcing point is a branch for an advance demand notice staging order, the tier one secondary source may be other distribution centers that can ship either to the customer's site or that can ship to the primary sourcing distribution center. In the latter example, the tier one distribution centers should also be able to move the requested items to the customer or the primary sourcing distribution center before a designated order delivery date using a normal shipping mode. To assist in the rules-based analysis, parameter tables may be used to define criteria such as the miles-radius for finding proximity branches and shipping time tables for determining candidate tier one distribution centers.

When assigning tier one secondary sourcing points to line items, it is further preferred that sourcing points be eliminated if the sourcing point is not equipped to handle direct shipment to customer's sites for ship-to orders and advance demand notice orders staged at the customer's site. Similarly, tier one secondary sourcing points may be eliminated if they are not capable of shipping Hazmat items. In the case of will-call orders, the tier one secondary sourcing points must be capable of having the customer come to the location to procure the requested item. As will be appreciated, walk-in orders are converted to will-call orders if the customer is referred to a tier one secondary sourcing point for order fulfillment.

Once the primary and tier one secondary sourcing points are determined for each line item, the intelligent order fulfillment planning procedure determines the on-hand inventory at the assigned sourcing points 304. This is preferably performed for both the specific item specified in the electronic order and any alternative equivalent items. On-hand inventory that is reserved should be removed from the count. Inventory that is in-transit that is expected to arrive and be put-away or cross-docked in time to permit an on-time pick up or pack and delivery of the order can be added to the count. In this regard, parameters such as put-away and cross-dock times may be kept in parameter tables so they can be easily changed as the logistics network environment changes.

To determine the fulfillment plan alternatives, the primary and tier one secondary sourcing points and their respective on-hand inventory for each line item is considered. If the entire order (i.e., each line item) can be filled using unreserved, on-hand inventory at the primary sourcing point, this inventory and sourcing point should be used to create the fulfillment plan. If, however, the primary sourcing point does not have enough unreserved, on-hand inventory to satisfy the entire order, additional fulfillment plan alternatives may be considered.

For creating additional fulfillment plan alternatives, the system may first determine if any currently reserved on-hand inventory at the primary sourcing point can be feasibly reallocated to the subject order. The reallocation may be deemed to be feasible if the item(s) to be replenished can be received, put-away, and packed/delivered in time to meet the order for which the item(s) are reserved. The costs associated with replenishing items in this manner should be assigned to the order that necessitated the action and not to the order associated with the reservation. A fulfillment plan alternative created in this manner will be added to a list of fulfillment plan alternatives to be considered for possible implementation.

A further fulfillment plan alternative can be created if the entire order can be supplied from the unreserved, on-hand inventory at the determined tier one secondary sourcing point. If the tier one secondary sourcing point has the unreserved, on-hand inventory to meet the order, this fulfillment plan alternative will be added to the list of fulfillment plan alternatives to be considered. If, however, the tier one secondary sourcing point does not have enough unreserved, on-hand inventory to meet the order, the system may determine if any currently reserved on-hand inventory at the tier one secondary sourcing point can be feasibly reallocated to the subject order using the approach described previously. A fulfillment plan alternative created using reallocated items would also be added to the list of fulfillment plan alternatives to be considered.

Candidate fulfillment plan alternatives will have a sourcing point for each line item in the quantities required by the order. The line item quantities can, however, be split between multiple sourcing points. Accordingly, the system should create fulfillment plan alternatives that use the various permutations/combinations of sourcing points capable of fulfilling either entire or partial line items at the primary and tier one secondary sourcing points.

Once all fulfillment plan alternatives have been created and added to the list for consideration, a fulfillment plan is selected for possible implementation. If multiple fulfillment plans have been created, selection should be based upon an evaluation of the costs associated with each fulfillment plan alternative. If no alternative fulfillment plans have been created using the methodology described above, a further iteration may be performed to devise additional fulfillment plans for consideration.

To select the fulfillment plan for the order, a cost analysis may be performed 305. In performing a cost analysis, the system considers the routing of each line item from a sourcing point to a delivery point, the activity costs for each line item's plan, as well as other factors. In this manner, a total weighted grade may be given to each fulfillment plan alternative from which the best alternative may be selected for implementation. As will be appreciated, if a fulfillment plan alternative is selected for implementation that relies upon replenishment orders, further orders within the supply chain are to be generated to reflect the replenishment activity.

To evaluate the routing of line items the shipping requirements of the customer are considered. How each line item is routed depends upon whether the customer requires a single consolidated shipment. If consolidation is required, additional candidate fulfillment plan alternatives need to be generated to consider a sourcing point at which to consolidate the order. For this purpose, three sourcing points can be considered for the point of consolidation: 1) the sourcing point from which the most line items are being sourced; 2) the sourcing point that minimizes the time required to consolidate all items not sourced at that sourcing point; and 3) the sourcing point that minimizes the cost required to consolidate all items not sourced at the sourcing point. Using this approach, each non-routed fulfillment plan alternative will be expanded into three routed alternatives, i.e., one for each of the possible consolidation points.

If the customer does not require a consolidated shipment, the system may nevertheless attempt consolidation should consolidation be determined to be advantageous. For example, consolidation may be advantageous if there are multiple line items with small-sized and/or low-valued items since the shipping costs to the customer of such items may exceed the combined shipping costs of moving the item using LTL to a consolidation point and then using package shipment for the final shipment to the customer. Since this trade-off is very situation dependent, it may be preferred to create these consolidated alternatives and then compare the costs associated with the consolidated alternatives to the costs associated with the non-consolidated alternatives. If the consolidated alternatives are determined to be more cost effective, the consolidated alternatives will be further considered even if the customer does not require consolidation.

To determine the activity costs for each line item within an order, the activity costs are accumulated as the item movement is traced from the point of sourcing to the point of final delivery. Activity costs include, but are not limited to: pick-up costs; put-away costs; cross-docking costs (if this occurs en-route to consolidation); carrying costs (if the item is inventoried temporarily during the consolidation process); shipping costs (e.g., LTL costs between logistic points and/or Package Shipment costs between logistic points and to the customer if required); and holding costs of the item's value over the delivery fulfillment period. The activity costs may be kept in parameter tables by location and by physical attributes of the items (e.g., size, weight, Hazmat, etc.). parameter values used in computing the activity costs may be kept in the ontology 92.

Further factors that may be considered when selecting a fulfillment plan may be used depending upon the situation and the business. For example, if there are other known orders for another customer, then there would be an opportunity cost associated with using the candidate item for the subject order and not fulfilling the order for the other customer. The magnitude of this opportunity can be partially based on the relative preferences of the two customers. In the case of advance demand notice orders, the difference between the probability of need for each advance demand notice order needs to be considered (regular orders are considered to have a 100% probability of need).

Another form of opportunity cost that can be considered is an anticipated peak in demand for the item at the sourcing location. This can occur either because of seasonal changes or because recent demand has been significantly below expectation and the law of averages expects that the short-term demand will be larger in order to reach the overall average demand over time. In this case, the computed opportunity cost will tend to favor alternatives where the item is sourced from a point not anticipating a short-term increase in demand over a sourcing point that is anticipating such a demand.

Yet another factor that may be considered is the degree to which the alternative fulfillment plans uses excess inventory. Excess inventory is the amount of unreserved inventory on-hand at a souring point that exceeds the stocking level for the location. An item may also be considered to be excess inventory if the item has not been demanded at a particular sourcing point for a given period of time (e.g., x months). If the use of excess inventory will be a factor in the evaluation of alternative fulfillment plans, then the cost associated with using excess inventory can be weighted to favor the selection of such a fulfillment plan. This can be accomplished by setting the cost equal to the negative of the carrying cost for a predetermined period of time, preferably, ½ the time period established above with respect to determining when an item is excess inventory.

Yet another factor that may be considered is the age of the inventory being used to source an order. In this case, the alternative fulfillment plan that uses the oldest inventory can be weighted to favor the selection of such a fulfillment plan. In order to provide this weighting, the ages of the inventory in all the alternative fulfillment plans will be considered. The age is the current date less the date at which the item was added to the inventory at the sourcing point. The cost may then be the maximum age minus the age of the candidate items multiplied by the daily carry cost amount for the item at that location. The following Table 1 provides an example.

TABLE 1

| Fulfillment Plan Alternative | Age Of Inventory | Daily Carry Cost At Location | Relative Cost |
| --- | --- | --- | --- |
| 1 | 15 | $0.0100 | $0.72 |
| 2 | 5 | $0.0140 | $1.15 |
| 3 | 45 | $0.0110 | $0.46 |
| 4 | 87 | $0.0100 | $0.00 |

In the example provided, the youngest alternative (5 days) has the largest cost while the oldest alternative (87 days) has zero cost. This type of factor is particularly useful if the distributor was concerned about an item becoming excess.

To compute the total weighted cost for the alternative fulfillment plans 306, the system should maintain a table that includes a weighting factor that is to be used for each of the evaluation criteria. The total weighted cost to the distributor may then be computed by multiplying the computed costs for the various criteria by their associated weighting factor. It will be appreciated that the total cost to the customer will be the cost of the items within the order plus any shipping costs plus any special charges assessed to the customer for the particular level of service the customer selects. Using the weighted approach in the evaluation of fulfillment plan alternatives is desired since it accounts for changes in circumstances. For example, even if repetitive executions of the intelligent order fulfillment system result in the same set of fulfillment plan alternatives being created, the fulfillment plan selected as the best viable plan may not be the same in each instance because of changes in circumstances between runs. The change in circumstances can be reflected by easily changing the weights assigned to criteria in the parameter tables.

To select one of the alternative fulfillment plans for implementation, the system determines if the alternative fulfillment plans meet a gross margin threshold for the preference category selected by the customer. The gross margin is computed for each of the alternative fulfillment plans as the total revenue to be received by the distributor (i.e., item price plus customer-paid shipping plus any special service charges) less the activity costs. For the advance demand notice situation, the distributor revenue is computed as though the customer has a 100% probability of need and will take delivery of the item. If the gross margin threshold is not met, the alternative fulfillment plan will not be considered to be profitable and will be disqualified from further consideration. If all of the alternative fulfillment plans fail to meet the gross margin threshold, the customer will be told that the order cannot be filled. On the other hand, if an alternative fulfillment plan is determined to meet the gross margin test, has the lowest total weighted cost to the supplier, and meets all of the delivery and price quote requirements of the customer, the alternative fulfillment plan is selected as the best plan for implementation. Alternatively, the system can eliminate those line items that cannot be fulfilled within the customer's requirement constraints leaving only a partial fulfillment to the order. The partial fulfillment can then be re-evaluated to determine if it now falls within the customer's requirements.

When determining if an alternative fulfillment plan meets the price quote requirements of the customer, it is determined whether the order quoted price and the actual fulfillment cost to the customer falls within a customer established tolerance. Tolerances for each customer may be maintained in the database. It will be appreciated that the actual fulfillment cost may vary from the quoted price owing to the need to meet the order from secondary sources and/or by substituting items. If the tolerance is exceeded, further customer authorization may be required to fulfill the order. If no authorization can be obtained, the fulfillment plan should be disqualified from consideration. When communications are possible with the customer, data should be solicited regarding the customer's ability to consider upgrade/downgrade item substitutions and/or the ability to backorder line items or the entire order. The backorder time can be either the time to fulfill the problem line item from the preferred remote sourcing point or the time required to order the line item from the manufacturer and either drop ship the item directly to the customer or deliver the item through the distributor's logistic network.

If no primary sourcing point fulfillment plan or tier one sourcing point fulfillment plan alternatives are selected as a viable fulfillment plan using the above described methodology, a second iteration of the above described steps may be used to create further sourcing fulfillment plan alternatives 307. In the second iteration of these steps, the distribution centers not considered in the first iteration will be considered. Additionally, consideration may be given to special ordering items from the manufacturer with either a direct ship to the customer or delivery through the logistic network of the distributor. When selecting a sourcing point fulfillment plan from the alternatives created in this manner, the same set of delivery requirements used previously are considered. If this second iteration fails to produce a viable fulfillment plan for implementation, further communications with the customer should be performed. If communications with the customer cannot be performed, the system may elect to implement a plan that partially fills the order.

If a line item cannot be filled using either the first or second iterations described above, a third iteration of the steps described previously may be employed wherein substitute items are considered 302. When substitute items are selected for consideration, it is preferred that the items identified as being substitutable be within customer specified parameter requirements (e.g., the customer can specify which item attributes can be varied and by how much). If the customer also has supplier diversity requirements, the system can take these into account when identifying suitable substitutes. If the use of substitute items does not produce a viable fulfillment plan, a further iteration of the above described steps may be performed if the customer has indicated a willingness to accept a back order delay for either a line item or for the entire order 308. In accordance with this fourth iteration, the delivery date will be modified as described previously such that the revised delivery time will be set to either the time from the best alternative that exceeds the original delivery time or the time required for a special order from the manufacturer if there exists no sourcing plan alternative using a manufacturer source. It is further noted that item substitution may cause the consumer cost threshold to be exceeded. In this case, the customer should be presented with the selected third iteration plan candidate together with the results of the fourth iteration whereby the customer may choose to either pay the higher price for the plan that will meet the delivery requirements or wait for the lower price with a backordered fulfillment plan from iteration four.

In sum, while the described intelligent order fulfillment plan methodology provides many alternatives to arrive at a viable order fulfillment plan, in practice, the vast majority of orders that will be entered into the system will be for single line items that may be fulfilled using the first or second iteration of the steps above-described. Therefore, in practice, there will not be a large number of alternatives that are created and evaluated. Furthermore, the branch and bound structure of the four described iterations will tend to limit the number of alternatives that will be generated and considered. Therefore, even if third and fourth iterations are utilized, the need to use these iterations will be reached only because there is limited item availability within the distributor logistics network. The first and second iterations will not have created a large number of alternatives in such instance because there will not have been a large number of possible sourcing points with available inventory.

For managing inventory within the n-tier logistics network, the system may also include agents for performing intelligent inventory management. The inventory management agents are provided to forecast item demand and establish base stocking levels and re-order points for items throughout a distributor's logistics network. The inventory management logic thus allows the distributor to position items within the logistics network in a manner that should maximize efficiency and profitability when selected sourcing plan alternatives are utilized.

The processes involved in managing the inventory are presented in a generalized manner so that they can be applied to any logistics network topology. Consequently, they are implemented using a high degree of table-driven and parameter driven software engineering techniques. In connection with the software, the described system is desired to operate in conjunction with the ontology 92 which includes an annotation with respect to any restrictions placed on individual items and their allowed locations in the n-tier logistics network. For example, Hazmat items may only be able to be shipped from certain facilities and slow moving items may only be stocked in certain distribution centers.

As will become apparent from the description that follows, the emphasis of the inventory management process is to allow the distributor to deal with probability and uncertainty in demand. Another purpose of the described process is to give suppliers/manufacturers advanced information regarding forecasts of future demand. After each forecast iteration, the manufacturer can be given consolidated demand and replenishment forecasts for their items over the forecasting horizon. The consolidated data can be further broken down by anticipated delivery point. Some manufacturers may desire the data for the immediate next quarter to be broken down in a finer level of detail such as forecasts by week.

Figure 8:
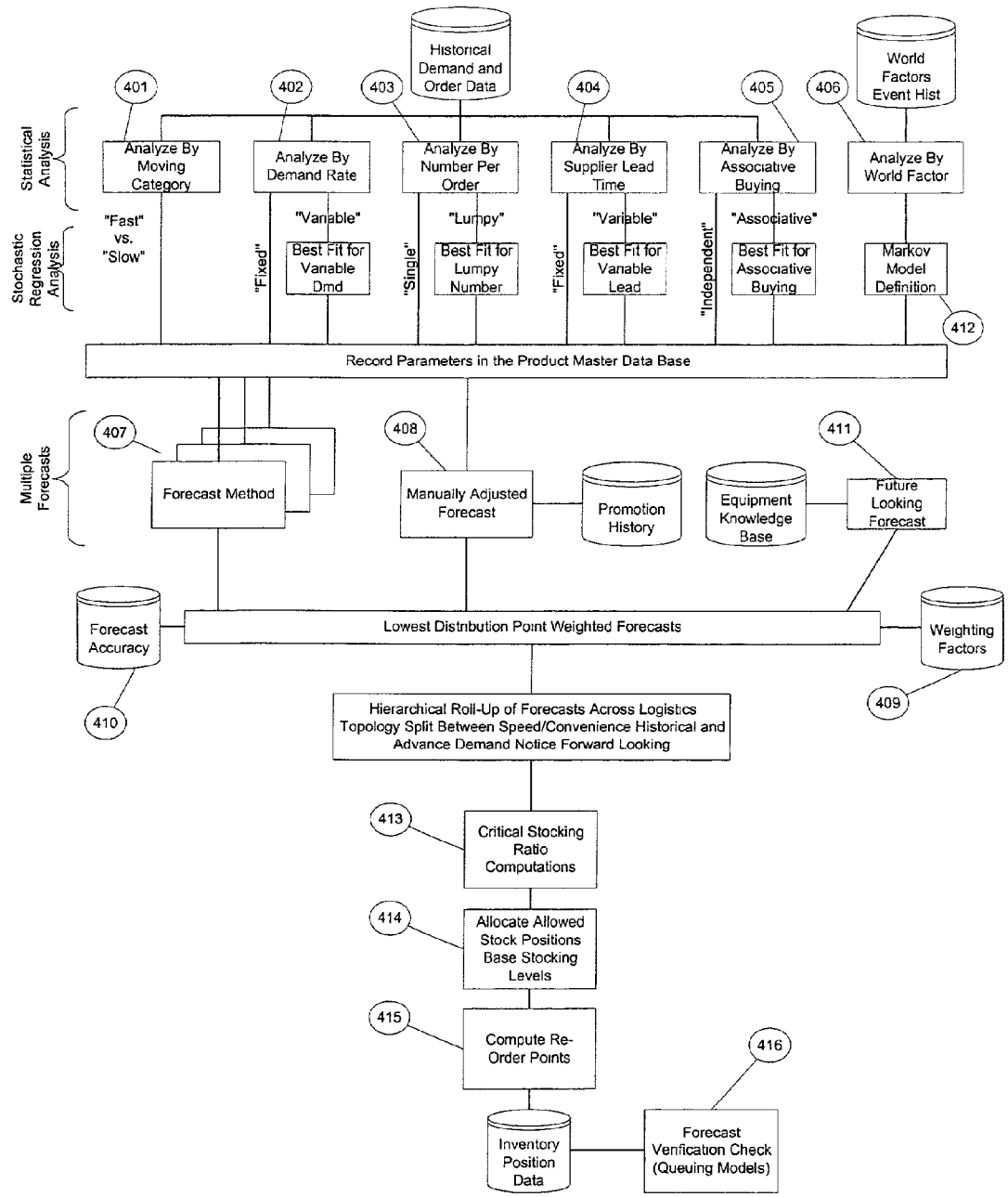
FIG. 8 is a diagram illustrating an exemplary inventory management system.

In the performance of the inventory management process, illustrated in FIG. 8, the system generally compiles and aggregates the historical demand data to be used in demand forecasting. To this end, the system relies upon item demand histories that are maintained within the system at a unit of time granularity determined by a system parameter. For example, demand histories for items may be aggregated by month, by quarter, by week, or by day. The choice of time unit can be made to reflect the overall size of the database (i.e., taking into account the volume of data implications on processing time) and the overall precision of the forecasting methodologies (i.e., some forecasting methodologies may provide forecasts that are reliable only at a monthly level).

The system then forecasts the combined demand and determines the critical stocking ratio that will indicate the total quantity the distributor can afford to hold in inventory during the forecast period. Using the determined critical stocking ratio, the system allocates the permitted inventory level among the various distribution points in the logistics network by assigning over the forecast time period the base stock level and the reorder point for each item at each distribution point. If a item is not to be allocated to a particular point, then the base stocking level for that point will be zero.

In connection with the allocation of inventory levels among the distribution points in the logistics network, the system determines the replenishment method that will be used for the items. If the use-one, replenish-one method is used, then the reorder point will be set to the base stock level minus 1. If the "(r,s)" policy is used, the re-order point, "r," will be set to whatever the chosen mathematical or heuristic algorithm determines. At this point, the system may run the initial replenishment processes that will create orders at any point where the unreserved on-hand inventory plus orders-in-transit quantities are less than the designated reorder point. This initial run will also determine the disposition of any item that has been reclassified as excess because the new base stock level for the item has been reduced or set to zero and the unreserved on-hand inventory of the item plus orders-in-transit of the item exceeds the new base stock level. Subsequent replenishments will be based on the current unreserved inventory position and the setting of the re-order points.

To determine the size of each forecast period for use in performing the inventory management process, system parameters are used. Generally forecasting will be done in monthly periods unless the inventory management team has a particular reason to choose a different period size. Other system parameters are used to determine how many periods to include in the forecast horizon. Generally, this will be either twelve or thirteen months, although there are many situations where the inventory management team will want to forecast only for a quarter or half-year. Still other system parameters may be used determine the frequency with which history data is extracted, aggregated and loaded in the database(s) that will drive forecasting. These activities will generally be tied into the distributors data warehouse Extract-Translate-Load (ETL) schedule since the same data is used for decision support analysis as is used for forecasting.

Further system parameters can be used to determine the frequency with which forecasting is done and which items are included in each forecasting cycle. Usually in the MRO environment, the distributor's ontology 92 and inventory/product databases embraces a large number of items and, for pragmatic purposes, the forecasting system(s) can only work on a portion of the total ontology 92 and inventory/product databases during one cycle. In general, the frequency and cycle assignments should be set up so that each item is re-forecast at least annually. Many times the inventory management team will want to re-forecast semi-annually or quarterly. A few items may warrant re-forecasting monthly. This simply points out the need to have all of these scheduling and assignment related attributes be parameter driven so that the inventory management team can easily change the attribute values.

To compile the historical demand data, items are categorized according to characteristics that effect the demand for items in a logistics network. The items can be categorized across the following segmentation dimensions: 1) moving category; 2) demand rate; 3) number per order; 4) world factors; and 5) lead-time. Preferably, the categorizations of an item are kept in system parameter tables so that the inventory management team can easily change them. The historical demand data for the items may also be maintained for each souring point within the logistics network. By way of example only, demand data may be maintained for each sourcing point and broken down as follows: 1) demand for replenishing lower tier sourcing points; and 2) demand for fulfilling customer orders (e.g., demand for fulfilling speed and convenience orders and demand for fulfilling advance demand notice orders).

Turning first to the moving categorization, an item will be classified as either "fast" or "slow" moving based on the level of demand for the item over a given time period 401. A system parameter defines the demand level threshold that separates the fast moving and slow moving characteristics. These parameters can be defined differently for different distribution points in the logistics network. Also, a particular item might be classified as slow moving at lower tiers in the network hierarchy and as fast moving in the higher tiers.

Within the demand rate category an item will be classified as having a "fixed" or "variable" demand rate based upon the rate that items experiences demand over a given period of time 402. Demand, at this point, is the arrival of customer orders. The determination is made by computing the standard deviation of the demand rates over the period within the history window. A system parameter defines the threshold of standard deviation as a percent of the mean that will be the dividing point between the two demand rate categories. For example, the inventory management team may consider any item having a standard deviation of 15% or less of the mean demand to be considered a fixed rate item and the mean will be used as the fixed demand rate. If demand is considered to be variable, then the historical data is run through regression analysis to determine if it can be "best fit" to one of the following stochastic distribution functions: Poisson, Exponential, or Gamma. If a distributor chooses to embrace other stochastic distribution functions, there is nothing in this process definition to prohibit that. The objective is to match the item demand history to some kind of stochastic distribution function which will subsequently be used in the forecasting process.

Within the number per order category an item will be classified as being either "single" or "lumpy" based upon the number of units of the item typically ordered 403. A single characterization will be a constant while a lumpy characterization will be random. As was done for demand rate, a standard deviation is computed for the quantity of units of the target item per order. This standard deviation expressed as a percent of the mean is compared to a system parameter threshold. If the standard deviation as a percent of the mean is below the threshold, the number per order is considered to be a constant and the mean (rounded up to the next whole number) is the single constant. If the percent exceeds the threshold, the number per order is lumpy. As with demand rate, an attempt will be made to determine the best stochastic distribution function fit using regression analysis to describe the lumpy number per order. Experience indicates that this is generally a Poisson distribution curve.

Within the world factors category, an item is annotated as to whether its demand is impacted by external world factors such as the weather, the economy, competition, change in customer status (where demand comes from only a small number of customers), etc 406. Due to the complexity of dealing with world factors in the forecasting process, this category can be restricted to the designation of only one world factor. If the item is not impacted by a world factor, then its designation will be "none."

To consider the historical effect of world factors, it is necessary for the distributor to have recorded the particular world factor events for each historical period. Each type of event has its own method of recording and association with demand. For example, with hurricanes, the occurrences are measured in "events." For severe summer heat, the world factor can be measured in degree-days for the region serviced by the distribution point. The parameters which define each world factor will also designate how it is to be associated with the demand. The historical data for all periods in which the world factor did not have an occurrence is compared against the periods during which such occurrences happened. The differences between these two demands represents the impact of the world factor during the historical horizon.

The exact method of associating world factor affect on demand is specified by parameters. Possibly ways include "percent increase per hurricane occurrence" or a table which indicates the incremental amount of demand of item in a period based on the number of days the temperature was a certain amount above the normal. Such a table might be as illustrated in Table 2.

TABLE 2

| | |
|---|---|
| Number of Days of 10 to 15 degrees above normal | 5% increase in demand per day |
| Number of Days of 16 to 20 degrees above normal | 10% increase in demand per day |
| Number of Days of over 20 degrees above normal | 15% increase in demand per day |

Recall that the item information database has the particular world factor (if any) that applies to the individual item. This will have been established by the item management team.

Finally, within the lead-time category an item will be classified as either "fixed" or "variable" as a function of the item's lead-time from the supplier 404. Much of this depends on the agreements that are negotiated between the distributor and the supplier and on the supplier's capability to either deliver from stock or deliver to order at a fixed lead-time. As with the demand rate, variable lead-time history will be regressively analyzed to determine the best-fit stochastic distribution function. Experience indicates that the Poisson distribution generally works. However, there are examples where the exponential distribution function is a better fit.

For those dimensions above-described that have a variable alternative, the item information database should also contain the designation of which stochastic distribution function is the best fit along with the applicable parameter values for that distribution function. Furthermore, it will be appreciated that, when taking the value combinations for these dimensions (moving is fast or slow, demand is fixed or variable, number per order is fixed or lumpy, world factors is yes or none, and lead-time is fixed or variable), all the combinations are considered and there will be at least one mathematical or heuristic forecasting method applicable to each combination. Some combinations will have several possible methods. Also, any particular mathematics or heuristic forecasting method may be applicable to more than one combination. Since the particular mathematics and heuristic forecasting algorithms and methods are well known, they will not be discussed in greater detail herein. Nevertheless, for further information on mathematical and heuristic algorithms and methods for inventory management, the reader is referred to *Foundations of Inventory Management* by Paul H. Zipkin (McGraw-Hill, 2000 ISBN 0-256-11379-3) which is incorporated herein by reference in its entirety. The factors that generally go into the mathematics and heuristics include cost of item, replenishment costs (both fixed and variable), costs of stockouts which include both lost margins and the potential for further lost business), holding and carrying costs, as well as the stochastic distribution function data.

When forecasting the combined demand, each item has at least one and ideally several different forecasts computed or determined 407. One of these forecasts is likely to be a manually adjusted forecast 408. The manually adjusted forecast gives the inventory management team and marketing team the opportunity to put in non-historical factors such as new item introductions, promotional programs, etc. If more than one forecast is used, then a weighted average is used to arrive at the demand forecast to be used in the inventory management processes 409. Part of the weighting factors includes an assessment as to how accurate the particular forecast methodology has been in the past 410. The weighting factors are all parameters that are set by the inventory management team. The demand forecast for each item at each distribution point for each period in the forecast horizon is made. For each distribution point, demand is first forecast for customer order fulfillment. Then demand is forecast for tier replenishment based on the forecast data from the lower tier distribution points that replenish from the subject distribution point. The customer fulfillment demand plus the tier replenishment demand together constitute the forecasted demand for the item at the target distribution point.

When forecasting the demand to fulfill customer speed and convenience orders, the mathematical algorithm(s) or heuristic(s) used depends on the settings for the moving category, the demand rate, and the number of units per order. If the item is coded as historically experiencing a constant number of items per order, then this constant is used as the number of items per order during the given forecast time period. If the item is coded for a lumpy number of items per order, then the fitted stochastic distribution function is used to determine the probability of "k" number of items per order during the given forecast time period. The value of "k" is determined so that the probability meets a threshold designated by a system parameter. This parameter is closely associated with the desired fill rate. For example, the threshold might be set by the inventory management team to be 95%. This establishes the value of "k" such that the probability that the order will contain "k" or fewer items per order is at least 95%. The value of the number of items per order for the given forecast time period is multiplied by the forecasted number of orders to arrive at the forecasted number of speed and convenience demand for the period.

When forecasting the demand for fulfilling advance demand notice orders, the system utilizes the Equipment Knowledge Base to analyze the customers who have equipment that might need the item in a maintenance task 411. These customers are within the service scope of the distribution point such that this distribution point would fulfill directly to the customer. Then based on entries in the Equipment Knowledge Base for the condition and age of the equipment and parts together with the reliability stochastic distribution function data, a forecast is made of the probability of needing the item at that customer during the forecast period. This is likely to result in a fractional probability for the individual period.

The probabilities of need are added for all the customers in the distribution point's scope. This sum is then rounded to the nearest integer using a threshold parameter as the basis for rounding. This is the threshold that the inventory management team believes is critical in order to comply with the level of service agreements with the customer. For example, this threshold might be specified as 80%. This means that if the probability of need is 80% or more at a distribution point, then we will consider this as a demand for 1 unit for forecasting purposes. The inventory management team considers the 80% likelihood as mandating the physical presence of the item for possible fulfillment. So, in this example, the rounding would occur as follows: 0 to 0.79 would round to zero; 0.8 to 1.79 would round to 1; 1.8 to 2.79 would round to 2; etc.

Since the distributor will not know if the item is actually needed even when the advance demand notice order is submitted for the maintenance work by the customer, the advance demand notice order rounding is done separately because the probability of need is different in concept from the probability of demand. The probability of need is based on the age and condition of equipment. It may be 10% in one period, 25% in the next period, 65% in the next period, 90% in the next period, etc. This does not mean that there will be demand for the item in each of the periods. Instead, it means that the likelihood of demand is increasing in each period. The actual demand and need will not be determined until the maintenance team inspects the equipment as part of the maintenance work. It is important that this threshold be implemented as a system parameter since it is likely that the inventory management team will have to modify its value from time to time as experience with the customers is gained. While the rounded amount is used as the forecast to the target distribution point, the unrounded sum is sent up to the next tier for accumulation summing over all the lower tier points. Separate rounding will occur at each tier in the logistics network. The rounded advance demand notice forecast is then added to the speed and convenience demand forecast computed earlier for the forecast period. Because the speed and convenience demand may still be a real number (whole integer plus a fraction), this sum may also be a real number.

The world factor (if any) is then applied to the combined customer fulfillment demand forecast. When world demand is involved, a Markov chain technique may be used 412. With this technique, the world is defined as a group of states and a state-transition diagram is created. Then the probability of moving from one state to another is specified. The inventory management team must determine the current state and state transitions that may occur in each of the forecasting periods. This consummates in the probability that a particular world event state will occur in the forecast period. This event has a correlated impact on the demand (often specified as a percentage increase to be applied). The calculated impact may then be applied to the combined advance demand and convenience demand forecasts to adjust the combined forecasts based on the expected probability of the world state occurring.

The next step in determining the combined demand forecast is to consider the tier replenishment forecasted demand. This requires that the demand for all the lower tier distribution points that replenish from the subject distribution point be already computed. The replenishment demand for those lower tiers is added together to create the total forecasted demand for the subject distribution point for the forecast period.

Finally, the historical data will indicate how much of this subject distribution point's inventory is replenished from higher level tier distribution points as oppose to be replenished directly by the supplier. The percent that is replenished through higher level tier distribution points is multiplied by the total forecasted demand to arrive at the forecasted replenishment demand that will be passed up to the higher level distribution point for its forecast computations.

It should be noted that for slow moving item, forecasted demand may only be for the given forecast period fractional (that is either less than 1 or a whole number plus some additional fractional amount such as 2.56). This is especially likely to occur at the lowest tier levels. If this is the situation, then the fractional demand is accumulated over chronological periods until it reaches a quantity greater than or equal to one. This whole unit of forecasted demand is then assigned to the forecast period where the accumulated fraction first exceeded 50%. Any rounded off residual fractional demand is assigned to the last chronological forecast period for the next chronological accumulation. An example is illustrated in Table 3.

To determine the critical stocking ratios 413, the system determines what quantity of an item the company can afford to stock in total. It is determined by a mathematical formula that accounts for the item's cost, gross margin, carrying costs, net working asset charges, expected demand, etc. It establishes that maximum amount of item that the company will stock at any one moment in time. The critical stocking ration computations are usually done for a planning horizon of a year since most of the factors going into the function are annualized factors.

For determining allocations and base stocking levels a preliminary base stocking level is first computed for each distribution point by using the mathematical algorithms and heuristics prescribed by the classification of the item along the Moving-Demand Rate—Number Per Order-World Factor-Lead-time dimensions. These mathematical algorithms and heuristics will also take into account the lead-time data discussed earlier. Once the preliminary base stocking levels are computed, they are accumulated over the entire logistics network and compared to the maximum stocking level allowed by the critical stocking ratio. If the total is less than the maximum allowed by the critical stocking ratio, then the base stocking levels are finalized and no further adjustments are needed.

If, however, the total exceeds the maximum allowed by the critical stocking ratio, then allocation must take place 414. If the critical stocking ratio amount will permit at least one unit at each distribution point that has a base stocking level set, then each such distribution point will have at least one unit in its base stocking level. The residual from the critical stocking ratio will then be allocated to those distribution points with the largest preliminary base stocking

TABLE 3

| Period Forecast | 0.15 | 0.35 | 0.20 | 0.45 | 0.15 | 0.15 | 0.20 | 0.10 | 0.15 | 0.25 | 0.20 |
|---|---|---|---|---|---|---|---|---|---|---|---|
| Accumulated | 0.15 | 0.50 | 0.70 | 1.15 | 1.30 | 1.45 | 1.65 | 1.75 | 1.90 | 2.15 | 2.35 |
| Forecasted Units | 0 | 1 | 0 | 0 | 0 | 0 | 1 | 0 | 0 | 0 | 0 |

Another example is illustrated in Table 4.

TABLE 4

| Period Forecast | 1.15 | 0.35 | 3.20 | 0.45 | 0.15 | 1.15 | 0.20 | 1.10 | 0.15 | 0.25 | 0.20 |
|---|---|---|---|---|---|---|---|---|---|---|---|
| Accumulated | 0.15 | 1.50 | 4.7 | 5.15 | 5.30 | 6.45 | 6.65 | 7.75 | 7.90 | 8.15 | 8.35 |
| Forecasted Units | 1 | 1 | 3 | 0 | 0 | 1 | 1 | 1 | 0 | 0 | 0 |

Note that the forecasted number of units of demand for each period is the accumulated amount rounded to the nearest whole integer less the accumulated forecasted units from prior periods. As was done with the advance demand notice fractional amounts, the rounded, whole integers are used for the target distribution point, but the unrounded amounts are forwarded upwards to the next higher tier distribution point when considering replenishment requirements. This enables the system to accumulate fractional amounts and do the rounding at the next tier which may result is a more precise network-wide computation of true demand. At this point in the process, there is a consolidated forecast of demand for the item at each point in the logistics network.

levels. Once the residual is used up, the remaining distribution points with preliminary base stocking levels will have those levels set to 1.

If the critical stocking ratio does not permit all the distribution points with a preliminary base stocking level to have at least 1 unit stocked, then allocation will be done by giving 1 unit of stock to the distribution points in the order of the distribution points with the largest preliminary stocking levels. The limited stocking amount is allocated in units of 1 to the distribution points in the sequence of decreasing amounts of preliminary stocking levels. For example, if the critical stocking ratio allows for 5 units total, then an exemplary allocation is illustrated in Table 5.

TABLE 5

| Inventory Point | A | B | C | D |
|---|---|---|---|---|
| Preliminary Base Stocking Level | 2 | 2 | 1 | 1 |
| Allocated Base Stocking Level | 2 | 1 | 1 | 1 |

However, if the critical stocking ration only allows 3 units, then the allocation will look like as illustrated in Table 6.

TABLE 6

| Inventory Point | A | B | C | D |
|---|---|---|---|---|
| Preliminary Base Stocking Level | 2 | 2 | 1 | 1 |
| Allocated Base Stocking Level | 1 | 1 | 1 | 0 |

A system parameter is used to permit the inventory management team to have the allocation process give preference to allocating stock to the middle and higher tier distribution points rather than to the lower tier points. This concentrates the limited stocking ability at points that can be quickly dispatched to the lower tiers of the network when the lower tiers experience real demand. If there is a large difference between the total preliminary base stocking levels and the maximum allowed by the critical stocking ratio, then this situation is brought to the attention of the inventory management team for manual intervention and resolution. There is a system parameter which specifies this difference threshold.

It is to be understood that the inventory management team has the ability to manually override these automatic base level computations if they choose to impose specific stocking models on certain distribution points. For example, certain lowest level tier points may have a list of "never out" items that is maintained for marketing purposes regardless of the financial considerations embraced in the inventory management processes. Or there may be a minimal "national stocking model" that is applied to all branches to have these branches stock a minimal set of common item.

To determine the replenishment method 415 to be used for the item at each distribution point a choice is made between a "use-one-replenish-one" method or a "reorder-point" method where no replenishment is initiated until the unreserved inventory on-hand and in-transit quantity falls below the reorder point. The same mathematical algorithms and heuristics used to determine the preliminary stocking levels will also be used to determine the replenishment methods. In general, most of these algorithms and heuristics determine the choice based on the value of the mean lead-time demand and the relationship between fixed and variable replenishment costs. The mean lead-time demand is the demand anticipated over the lead-time to replenish stock. Lead-time is measured as the time between the point where the replenishment need is computed to the point where the stock has been received and put-away (or cross-docked) and is ready to be used in subsequent fulfillment.

Once the base stocking levels and re-order points have been set, the first replenishment process that is performed will place the replenishment orders to bring the logistics network into some initial state of readiness. Because of the domino effect in a logistics network topology of many tiers, it may require several replenishment iterations before the inventory state is brought into conformance with the desired state as specified in the inventory planning processes, algorithms and heuristics. During this process a situation may develop wherein forecasted demand from the current iteration may be substantially less than that forecasted in prior iterations. This may result in on-hand inventory becoming excess. When there is excess inventory, the system will execute a "reverse fulfillment planning process" to determine the disposition of the excess inventory. This process will take into account any future expected increases in demand, costs of handling excess inventory, and candidate consolidation points for the excess. It is quite possible that the process may decide that some excess inventory should simply be left in place. This may be the case if there is still forecasted demand, but the new demand is less than the previous demand. This may also be the case if the costs of moving the excess exceeds the value of the excess.

To determine the degree to which the mathematical algorithms and heuristics used to create the forecast will be employed in the future or replaced with other alternatives, the system may capture the accuracy of the forecasts. In this regard, accuracy may be measured in a couple of ways. One is the amount of overstock that occurs from over forecasting. It will be most apparent in metrics such as total inventory value, inventory turns, amount of excess, etc. Another way is caused by under forecasting which results in inventory outages and is reflected in order fulfillment rates. The historical accuracy of the forecasts can be used to affect the assignment of weighting factors the inventory management team uses to determine the weighted average forecasted demand.

Another factor considered in determining forecasts may be correlated demand. In this regard, some items have a demand that is correlated to the demand for other items. To determine the impact of correlated demand, the historical orders need to be analyzed to determine what items are bought on the same order as other items 405. This is exactly the kind of associative buying analysis that retailers such as grocery stores routinely perform using data from the frequent shopper card program. If a large size of orders is involved, it may be necessary to do this analysis many times with each iteration analyzing a manageably sized group of items. There will be a system parameter which specifies the frequency with which this analysis takes place. This frequency then determines the size of the item group (size will be the total size divided by the number of cycles per year—assuming that all items should be analyzed each year).

More specifically, to evaluate correlation for a given item a list of correlated item pairs will be created based on what other items were bought on the same order as the target item. The number of occurrences of this pair of purchases will be tallied over a predetermined time period, e.g., a year. A system parameter will specify a threshold of occurrences that must be met in order to consider a correlation between an item pair. This threshold can either be an absolute amount (such as 10 occurrences) or a percentage of the total number of orders involving the target item (such as 60% of all orders of the target item involved also buying the correlated item). Any item pairs failing the threshold test are discarded.

If a correlation is determined to exist, the system then determines the percentage of total demand for the target item that is correlated demand. Product managers will have to provide input as to which of the two items in the pair is the primary (the item purchased independently) and secondary (the one purchased because the other was purchased). This information is then recorded in the product database. When customer speed and convenience demand is computed for the item during the forecasting cycle, it is computed in two parts—the part of demand that comes from primary demand and the part of demand that comes from secondary demand. In order to compute the secondary demand, the demand for the other item in the pair must first be computed. Then the correlation factor from the item database is applied to arrive at the correlated or secondary demand for the target item. The primary and secondary demands are added together to form the total forecasted speed and convenience demand. When the system determines and analyzes the demand profile for the target item, only primary demand is considered. The demand rate for the secondary demand will follow the demand profile of the other correlated item (which is the primary item of the pair). If the target item is the primary item of the pair, then its entire demand is considered primary and included in the demand profile analysis.

Another factor to be considered when determining demand forecast is promotions. In this regard, promotions need to be handled manually in the inventory management processes. The marketing team will design and schedule promotions and the inventory management team will work with the marketing team to determine the expected impact of the promotion campaign on demand. This impact must be manually entered into the system as a specific forecast that is considered in the weighted average forecasted demand. It is also necessary for the system to track the actual results of the promotion so that promotion-generated demand can be excluded from the historical database used in forecasting.

Often an M/M/M, M/M/G, G/M/M, etc. queuing models can be used to verify or confirm forecasted amounts 416. Here the queue arrival rate is the order or demand rate. The stochastic distribution function used in the demand rate is the arrival distribution use in the queuing model. The service time is the replenishment lead-time. For variable lead-times, the queuing model uses the same distribution function as is used to model a variable lead-time. The probability of having no customers (orders or demand) in the queue is computed for the queuing model using the coefficient of variation for the particular distribution function. If the probability of no orders in the queue is less than 1, then the inventory point will experience stockouts with a stockout probability of 1 minus the probability of no orders in the queue. Another check is done to determine if the traffic intensity is less than the number of servers (size of the base stock level). If it is not, then stockouts will occur.

Figure 9:
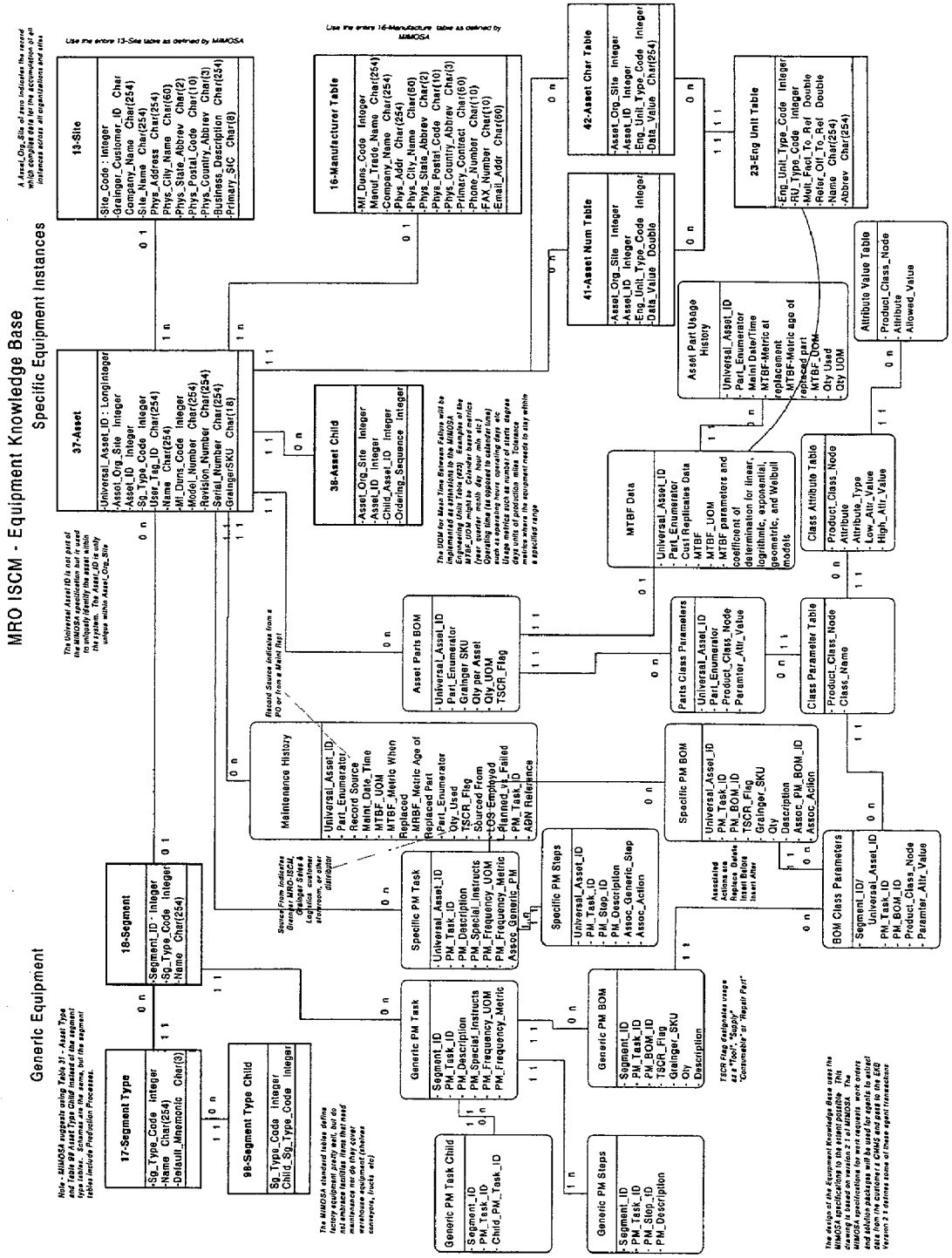
FIG. 9 is a diagram illustrating an exemplary equipment knowledge base.

To assist in determining the probabilities that a customer will need a particular product, i.e., to perform a maintenance task on a piece of equipment or components of it facilities, the supplier spoke supports the Equipment Knowledge Base. The Equipment Knowledge Base is illustrated in context as element KB-3 in FIG. 12. Specifically, the Equipment Knowledge Base contains data on generic equipment and facilities as well as on specific equipment as illustrated in FIG. 9. The intent is to have basic maintenance task information available on a generic basis in case the customer does not provide data on a specific piece of equipment. The generic maintenance tasks will include steps, plus to the extent possible in a generic situation, a bill of materials for the tools, supplies, consumable and repair parts needed for the task.

Specific instances of equipment will be associated with generic types of equipment. The maintenance tasks for the specific equipment will reference their counterparts in the generic area and will specify replacement, deletion, insertion of the steps and parts, materials, etc. To create a maintenance task for a specific piece of equipment, the system will start with the associated generic data (if it exists) and replace, delete and insert details for the specific equipment as indicated.

Actual maintenance history data which includes the use of products will be kept on a specific equipment basis. Where a customer enrolls in the supply chain management program, their equipment and facilities inventory will be registered with the distributor. The Equipment Knowledge Base will include roll-up records to consolidate dates from multiple instances of the same specific equipment across customers and customer sites. Equipment and facilities can be comprised of hierarchically organized components. Maintenance history is generally compiled at the lowest level of hierarchical detail as appropriate.

Certain of the key features of the Equipment Knowledge Base are based on the Machinery Information Management Open System Alliance ("MIMOSA") specification. The MIMOSA web site contains the details of this specification: http://www.mimosa.org/. In this regard, MIMOSA has specified both data base design schema and data exchange definitions that facilitate the open electronic exchange of data for equipment characterization, operation, and maintenance. Where the customer's systems are not MIMOSA compliant, the intelligent software agents will translate back and forth between the MIMOSA standard and the native interface of the system of the customer.

Figure 10A:
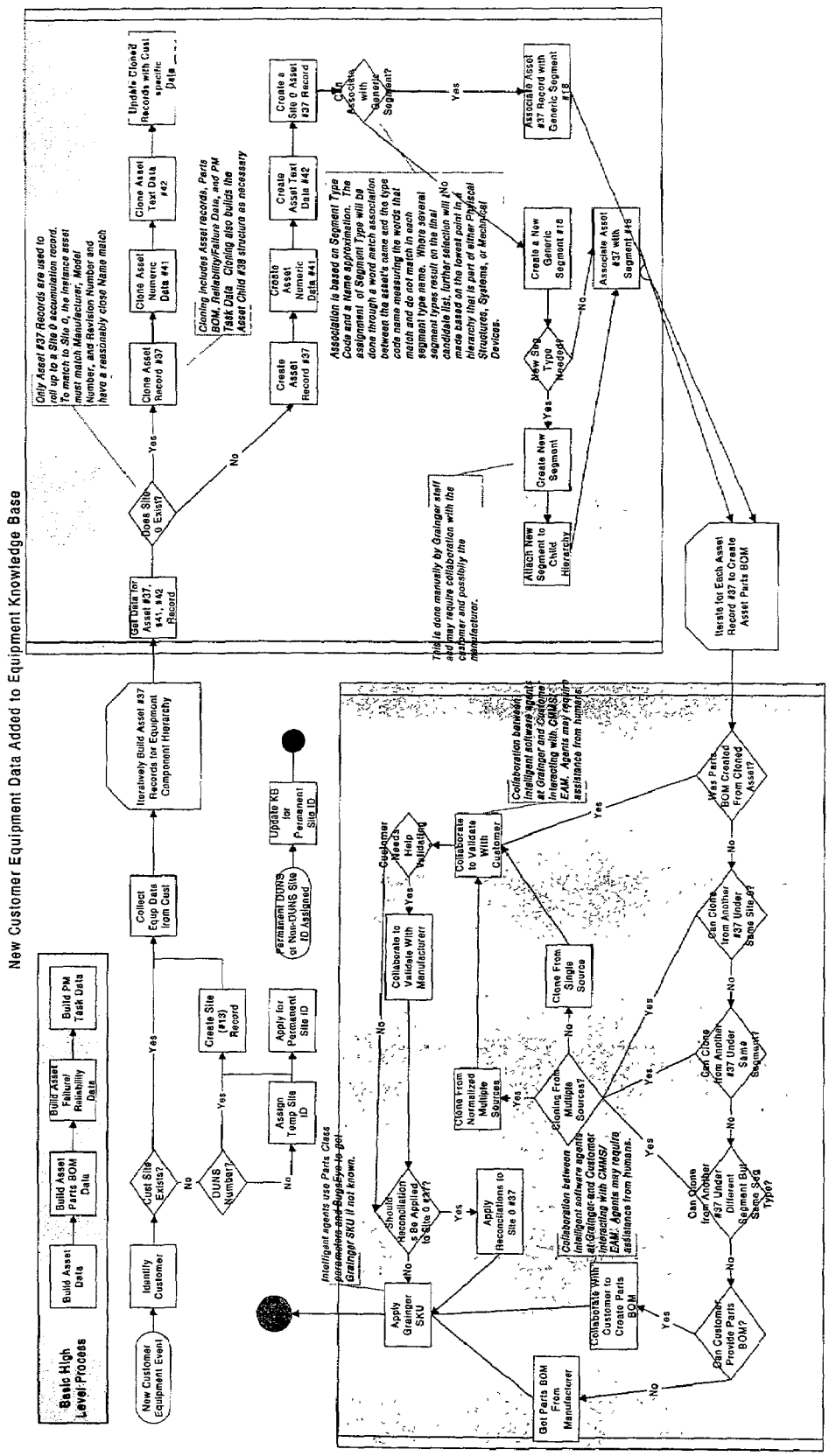
FIG. 10 is a diagram illustrating an exemplary process for adding customer equipment to the equipment knowledge base illustrated in FIG. 9.
Figure 10B:
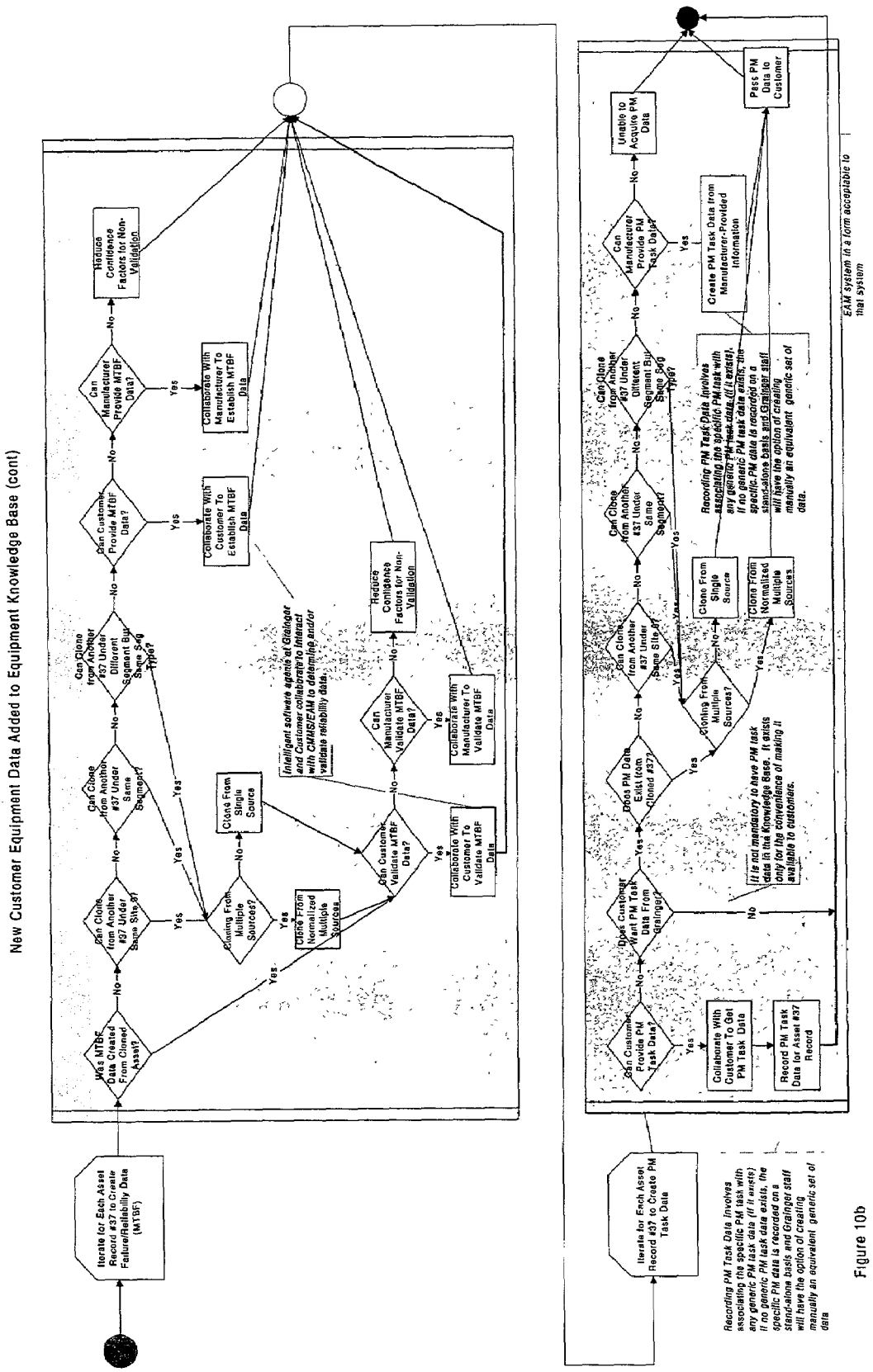

With reference to FIGS. 10a and 10b, new equipment is added to the Equipment Knowledge Base in two situations. The first situation is where a customer is first implemented/installed in the supply chain program. In this situation, all of the equipment that a customer chooses to embrace adds a new piece of equipment to the Equipment Knowledge Base. Customers can pick and choose what equipment and facilities they wish to include.

If a customer chooses not to include a specific piece of equipment in the program, the customer can still order products for the equipment/facility but will have to order the product directly (i.e., walk in order) or provide a probability of need in an advance demand notice order. A customer provided probability of need is obviously required in this instance since the system will not have the capability of determining the probability of need of a product not included in the Equipment Knowledge Base. Marketing and business policies, rules and procedures may also need to be developed on the fly when the system handles transactions where the customer's equipment is not included in the Equipment Knowledge Base.

For use in managing the maintenance activities at the customer, the Equipment Knowledge Base interacts with the CMMS legacy system 16 of the customer. Some customers may also use equipment condition data acquisition software to capture and record condition data in a database for analysis. These data acquisition systems often supplement the CMMS systems to monitor the condition of equipment and to automatically schedule maintenance tasks when problems are detected. The distributor may also provide intelligent software agents to interface with these data acquisition systems.

When a customer is first installed and registered in the supply chain management system, entries are made in the registry of the distributor as illustrated in the process flow chart of FIG. 10a. Implied in the process flow chart is that much of the data acquisition from customers is accomplished by the exchange of messages between intelligent agents collaborating with each other to extract data from the customer's CMMS 16 and/or data acquisition system. To this end, the data included in the registry of the distributor may include a list of customer sites with cross reference tables including how a customer identifies a site and how the Equipment Knowledge Base identifies a site. In this manner, the intelligent software agents will be able to automatically translate between the different identification schemes.

When a customer first registers, the software agent of the distributor spoke will request the agents attached to the customer's systems to search their data services for information on equipment. For each piece of equipment found by the agents on the customer side, the agents will create a "new customer equipment event" performative and thus begin the processing depicted in FIG. 10a. After this initial registration, the software agents at the customer's spoke will continue to monitor the CMMS 16 and/or data acquisition system to which they are attached for new additions to equipment and factories catalogued in those systems. Again, when the software agent detects such a new addition, it will create a "new customer equipment event" performative and pass the performative to the agents on the distributor spoke for processing.

When the distributor spoke receives a "new customer equipment event" performative, the customer system agent may or may not have included an identifier for the site. Nevertheless, the customer side agent will have included the identification from the CMMS 16 and/or data acquisition system that can be correlated to the site. The distributor agents can then send a message back to the customer agent instructing the customer agents to use the appropriate site identifier in future messages.

Depending on how the customer has identified the equipment in the CMMS 16, the software agents at both the customer spoke and the distributor spoke may have to collaborate to resolve any semantic differences in manufacturer's name and the equipment names and model numbers. This will be necessary to determine if a site record already exists for the equipment being added. Once the manufacturer's ID and the model number have been established, then how the customer names the equipment does not need to match exactly the name on the site record. The name on the customer's site detail record for the asset will always be the name that is used in the customer's system. Otherwise, the user tag identifier will always be the way the customer's CMMS 16 identifies the specific piece of equipment. Once all of this has initially been established, the customer spoke software agents need only evaluate the identifier for the site together with the user-id-tag to correctly identify the equipment in the Equipment Knowledge Base for all subsequent transaction activity, including advance demand notice orders.

Where the depiction of the process illustrated in FIG. 10 indicates collaboration is needed to validate something with the customer, the software agents will perform as much validation as is possible and involve all means at the customer site to complete the validation. Validation confirmation and/or changes entered by human interaction will be captured by the customer site agents and sent to the distributor. For example, part of the validation of equipment bill of materials is to ensure that the bill of materials in the Equipment Knowledge Base agrees with the bill of materials in customer's CMMS system 16. This may involve some complex collaboration between the software agents and possible involve the humans for final resolution. Where validation collaboration with manufacturer's is involved, the distributor system and network will facilitate the collaboration process, but the actual collaboration will be between humans from the customer and the manufacturer.

Failure/reliability data in the Equipment Knowledge Base will only be at a summary lever, detailed only to the degree needed to predict probability of need. This is likely to be some kind of metric time between failures. Detailed observation recording need not be kept by the distributor. This level of detail can be kept by the customer, either in the customer's CMMS 16 or condition monitoring system.

Some customers may choose not to keep any reliability data in their systems. In this case, the distributor and the customer will have to collaborate to attempt to learn what metric to use and what the metric value was the last time a particular part was used for the equipment. This will be the minimum data needed for the supply chain system to attempt a prediction of the probability of need for the part. In the absence of such data, the Equipment Knowledge Base will capture the first metric point when the first maintenance task is performed and work forward from that point. Also, in this case, the confidence factors will need to be set to zero until some basic reference point the metric is established. Once the maintenance data is established for the new equipment, the validation step with the customer will include passing the data on reliability to the customer's agent if the customer's system will also retain this information. The software agents at the customer side will take care of the translation between the reliability data forms and the metrics used by the Equipment Knowledge Base and the forms and metrics used by the customer's systems.

An equipment retirement is triggered when a customer removes a piece of equipment from its CMMS 16 and/or data acquisition system. The intelligent software agent that interfaces with the customer's CMMS 16 or data acquisition system will detect this deletion action and indicate the transaction to the distributor system. If the customer does not catalog the equipment in a CMMS 16 or data acquisition system, then the customer will need to notify the distributor of the equipment retirement by contacting the distributor. The distributor can then manually initiate the system transaction event.

When equipment is retired, the equipment asset records need not be deleted from the Equipment Knowledge Base. Instead, the record's status flag can be set. In accordance with the MIMOSA standards specification, flags can be used to indicate the following record status: 1=active row; 2=inactive row; and 3=soft delete row. In this case, the "customer retire equipment" event will cause the row status code to be set to "2" to indicate that the record is inactive. This enables all the historical data, especially the reliability data, to be retained and associated with the site roll-up record for all instances of that particular equipment. The intelligent agents which are predicting probability of need for an advance demand notice for other instances of the same equipment will likely need to refer to the historical data about the retired piece of equipment. The non-deletion of the record is also preferred since the piece of equipment may subsequently be installed at a different site of the customer or be sold to a different customer. In this case, where a "new customer equipment event" performative is processed, the maintenance programs will find the evidence record by matching the model number and serial number.

If a site roll-up asset record has all of its records set to the inactive status, then this indicates a situation where there are no longer any instances of equipment use. When this happens, the row status should be set to "3" to indicate a soft delete. At this point, the entire set of affiliated records can be subjected to some kind of records retention policy that indicates the period of time before the records will be physically deleted from the Equipment Knowledge Base. Part of the records retention policy should specify that the equipment manufacturers confirm that the equipment is truly outdated and no longer being used by any of its customers. When a physical deletion actually occurs, the records will be placed in an archives file.

To create in the Equipment Knowledge Base data about the reliability of the products used to maintain the customer's equipment, intelligent agents are used to capture maintenance data at the customer's site. This reliability data is used to predict the need for a specific product where some maintenance job is performed on the equipment. By predicting the probability of need, safety stocks through the supply chain can be better managed and minimized.

To predict the probablility of need, data on parts may be kept in the form of quantity needed per maintenance task within the Equipment Knowledge Base. For example, supply parts are typically not re-used in multiple maintenance tasks but are disposed of when the task is completed. While this quantity is often fixed, other times it may be represented by a curve, e.g., a bell curve. The data record for a supply part can thus contain the mean and standard deviation which can be computed from the maintenance history record for that supply part. When an advance demand notice cites a supply part, the Equipment Knowledge Base will return the probability for the cumulative distribution in the quantity on the advance demand notice.

Data on consumable parts may be kept in the form of quantity consumed in a period of time. The part usage history record in this instance will show the quantity used and the time metric for the part will be the time since the consumable was last replenished in the equipment. The data may be kept as a normal distribution with a mean and standard deviation. When an advance demand notice is received, it will cite the quantity of consumable expedited to be used and the time since the last replenishment.

Since both supply parts and consumable parts use the normal distribution, when the supply quantity or the consumable quantity per time equal their respective means, the probability of need will be 50%. The system will add 50% to this probability of need so that the supply chain probability of need will be 100% of the anticipated demand for the mean quantity or mean quantity per time for the product. In some cases, such as an order for tools, the standard deviation will be zero. In this case, the probability that the advance demand notice quantity will be needed will always be 100%. In most cases, when customers list tools and/or consumable on an advance demand notice order, the customer will be designating a 100% probability of need and what results from the Equipment Knowledge Base will generally not matter.

For repair parts, the history record may contain records of when specified repair parts are replaced in the equipment. The history record will show the time when the part was replaced and the age of the replaced part. If the user does not specify the age of the replaced part, the system can calculate the age from the previous history records unless this is the first record.

Figure 11:
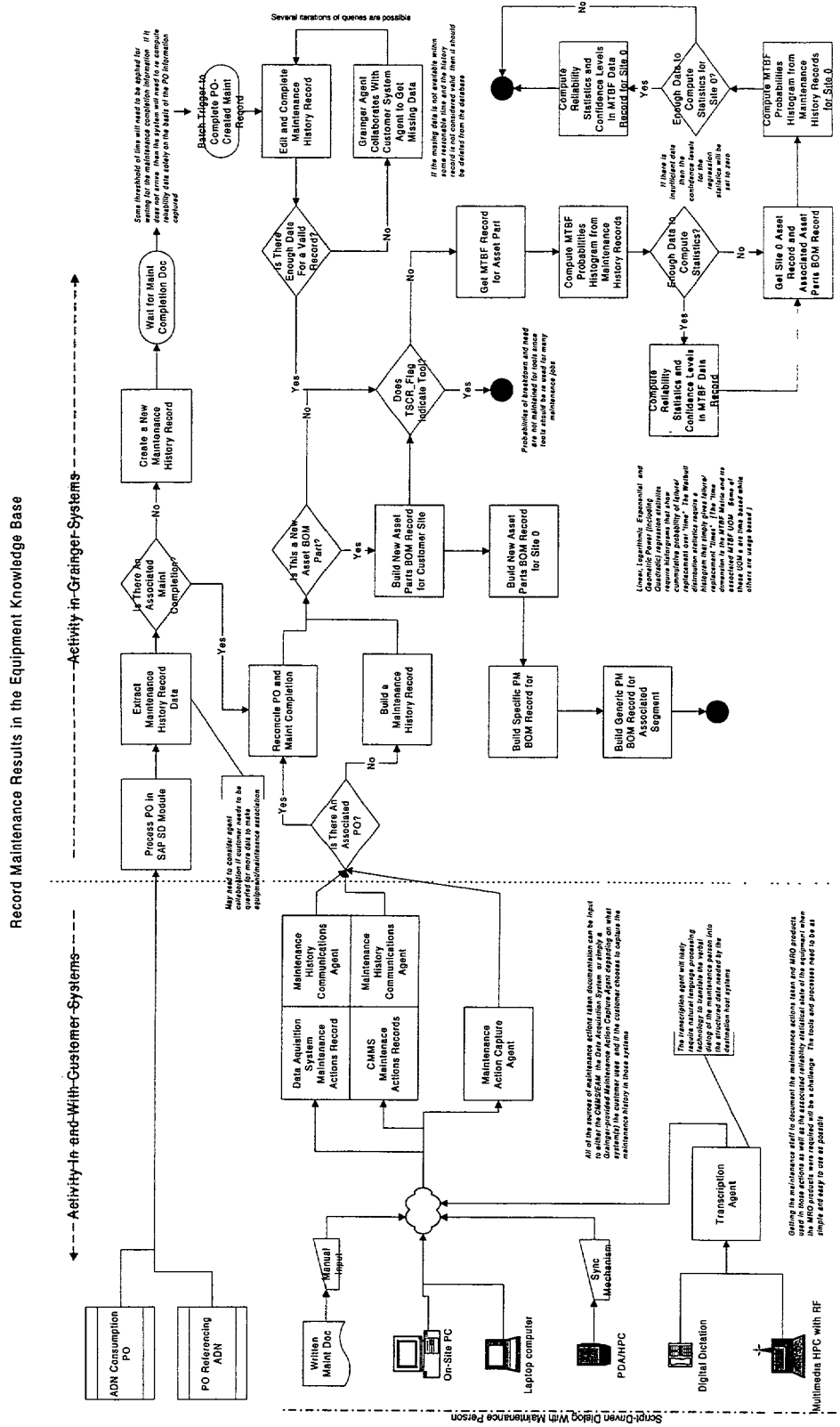
FIG. 11 is a diagram illustrating an exemplary process for recording maintenance results in the equipment knowledge base illustrated in FIG. 9.

There are two ways that maintenance data can be captured and sent to the distributor for inclusion in the Equipment Knowledge Base (see FIG. 11). The first is when a customer places a purchase order for the product. If the purchase order can be associated with the maintenance tasks, then the items in the purchase order can be analyzed for inclusion in the Equipment Knowledge Base. Alternatively, the maintenance results data can be gathered from maintenance documentation completed by the maintenance staff. For the purpose of providing a check, both methods of capturing data are preferred to be utilized.

The maintenance staff can use a variety of methods and tools to create documentation on maintenance actions taken. These can range from totally non-technical paper-based documentation reporting that is manually entered into the system to state-of-the-art multimedia-based personal digital assistants or wearable computers that are RF-connected to system and allow maintenance staff personnel to voice dictate their maintenance curb as it progresses. Maintenance staff personnel can also use PCs which may or may not be connected to the customer's LAN while maintenance is being performed. In this situation, the maintenance staff personnel uses the laptop to record maintenance actions which are subsequently transferred from the PC to the legacy maintenance report system.

In order to ensure that the right data gets collected by maintenance staff personnel, scripts may be provided that solicit entry of necessary pieces of data. If the data is ultimately going through a CMMS system 16, then the CMMS system may have such scripts embedded in the design of its user interface screens. In other cases, the distributor may provide these scripts. The scripts can be in the form of low-tech "cheat-sheets" used for written documentation, pre-printed written form data collection programs for the PCs, and/or guideline prompts for digital dictation. As a minimum, the scripts should elicit the following information which will be used to populate the Equipment Knowledge Base: identification of the customer site and equipment; date maintenance task performed, the current usage, meter reading, or some other metric used to track reliability and failure/life of the replaced part; the product(s) used and the associated quantities; and whether the product(s) was used as a tool, supply, consumable, or a repair part.

When the intelligent agents extract the above-described maintenance data from the CMMS 16 or data acquisition systems, intelligent agents at the distribution spoke first determine if the same event data has already been received by way of the purchase order channel. If it has, then the reconciliation process is started. If it has not, then a new maintenance history record is created and added to the data base.

The reconciliation process is an intelligent process that is used to reconcile things like purchase order dates being different from maintenance dates as indicated by maintenance records. Such differences can be reconciled looking for duplicate purchase orders. It is also possible that a product cited in a maintenance history documentation has not yet been included in an asset path bill of materials. In this case, a new asset path bill of materials record can be added for the specific equipment at this customer site and for the site equipment accumulation record.

Once the maintenance history record has been added to the Equipment Knowledge Base, the reliability/failure status needs to be recomputed for the individual piece of equipment and for the site record. Reliability states need not be computed for "tools" but only for "parts." Usage status for consumables and supplies will become the basis for subsequent prediction of the probability and need when an advance demand notice order is processed, and ultimately provide a basis for replacing safety stock levels throughout the supply chain.

Figure 12:
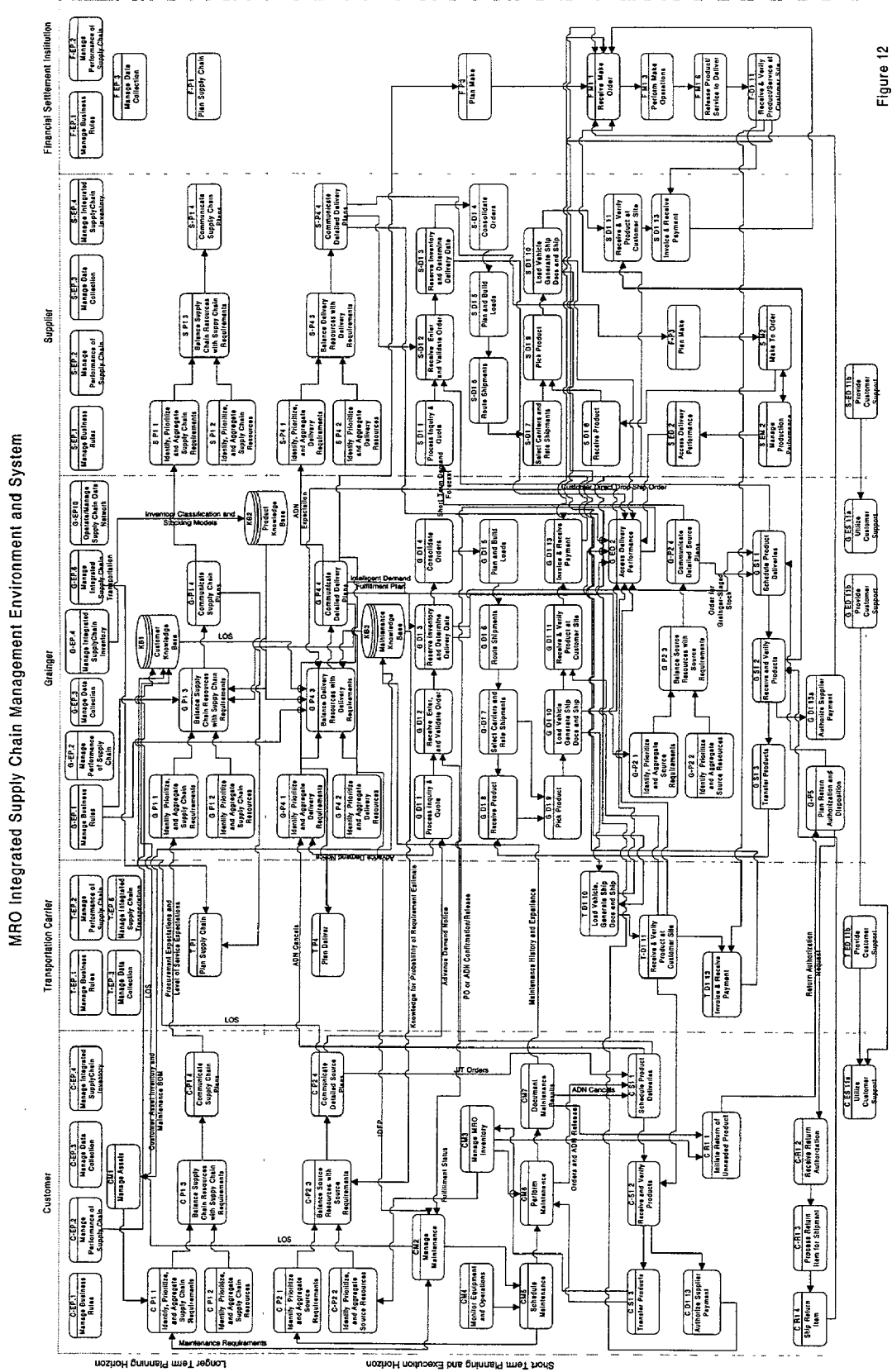
FIG. 12 is a diagram illustrating an exemplary integrated supply chain management environment.

With reference to FIGS. 2 and 12, an example of end-to-end flows across the supply chain is provided. In this regard, the following example traces the flow of activity throughout the supply chain network from the time a customer determines that maintenance will be required on a piece of equipment until the maintenance is complete and the distributor has invoiced the customer for the products used in the maintenance work. When following the process with reference to FIG. 12, it is to be noted that processes starting with the letter "C" are for the customer and appear on the left side of the diagram, processes starting with the letter "G" are for the distributor and appear in the center of the diagram, processes starting with the letter "S" are for the supplier and appear on the right side of the diagram, and processes starting with the letter "T" are for the transportation carrier and appear between the left and center of the diagram.

The exemplary process begins when the customer's condition monitoring system detects a deterioration of the widget on equipment XYZ and determines that maintenance should be scheduled [CM4]. The condition monitoring system interacts with the CMMS system 16 so that the CMMS system 16 schedules a maintenance task to be done in eight days [CM5]. The legacy interface agent 80 that monitors the CMMS system 16 will then detect that a new maintenance task has been scheduled. It immediately triggers an internal AIP to initiate tracking of this new maintenance task. This is accomplished by having the legacy interface agent 80 send an alert message to the domain manager 74. Based on the message type and contents, the domain manager 74 determines the AIP that applies to start tracking this maintenance task.

The AIP manager 76 will open a new AIP instance and begin assigning the activity tasks to the various agents to begin tracking this maintenance task. The end result of this set of activities is that the ontology 92 is updated regarding the equipment, the condition of the widget, and the fact that a maintenance task has been scheduled for a certain date. The last activity in this AIP is to initiate an "evaluate" performative to a "planning algorithm" agent to determine how the repair parts will be sourced and assigned or reserved to the maintenance task. This is actually accomplished by having the AIP manager 76 initiate an AIP instance for the AIP that determines pre-maintenance parts sourcing [C-P2.1].

The AIP for pre-maintenance planning parts sourcing directs a "planning" agent to collaborate with the CMMS legacy interface agent 80 to determine the souring plan. The "planning" agent determines from the CMMS system 16 that in addition to the widget 1, a widget 2 will also have to be replaced if, in fact, widget 1 fails [C-P2.2]. There is a spare widget 1 in the local storeroom, but there is no widget 2 in the local storeroom [CM3 and C-P2.3]. The "planning" agent also determines that if the spare widget 1 is used in the maintenance operation it will have to be replenished from the distributor. The determined plan is communicated to the CMMS system 16 so that the CMMS system 16 can create an advance demand notice order [C-P2.4].

During the planning process, several rule sets are extracted from the ontology 92 and run through the inference engine 86 to arrive at the final decisions and plan. Throughout the planning activity additional detail is also added to the ontology 92. For example, some of the applicable ontology 92 data actually resides in the condition monitoring system database and the CMMS database to which pointers are added to the ontology 92.

When the CMMS 16 creates the advance demand notice order for the maintenance task [C-S1.1] the advance demand notice has two line items, one for widget 1 and one for widget 2. The line item for widget 2 specifies a level of service to have the product staged at the local branch two days before the maintenance task is scheduled to be done. The other line item specifies that widget 1 is to be staged for non-urgent delivery to the customer. Since this line item is being used to replace existing local inventory, there is no hurry in having the replacement delivered to the customer. The CMMS system 16 requests the domain manager 74, through the legacy system agent 80, to initiate a "business transaction" performative to pass the advance demand order to the distributor [C-P2.4 and C-S1.1].

The domain manager 74 determines that the "submit advance demand notice" AIP will be executed and instructs the AIP manager 76 to start an instance of that AIP. This AIP requires that the CMMS 16 pass the advance demand notice transaction to an "information type" algorithm executor agent 84 which will package the advance demand notice into the appropriate "trigger-event" performative. This performative is sent to the AIP manager 76 which, in turn, sends it to the communications layer 60 where it is sent to the distributor. Since the AIP indicates that the distributor is to send an acknowledgement, the AIP remains open.

The "trigger-event" performative is sent to the distributor's agent server 12 via the broker 10. The distributor's domain manager 74 determines that this "trigger-event" performative involves a new advance demand notice with the "submit advance demand notice" AIP. The distributor's domain manager 74 instructs the distributor's AIP manager 76 which opens up a new instance of the AIP. This AIP is only interested in the roles that the distributor will play in the transaction.

The distributor's AIP manager 76 instructs the order management system 26 (through the legacy interface agent 80) to accept the advance demand notice [G-D1.1]. The order management system 26 accepts the advance demand notice order and assigns a receipt confirmation number which is passed to the AIP manager 76 [G-D1.2]. The AIP manager 76 uses an "information type" algorithm executor 84 to package the confirmation number in a "reply" performative. The "reply" performative is returned to the AIP manager 76 which sends it to the communication layer 60 for delivery to the customer spoke agent server 12. All of this activity has caused certain entries to be made in the distributor's ontology 92 regarding the existence of the new advance demand notice order, the equipment involved, and the two parts cited in the advance demand notice order. The distributor AIP manager 76 also starts an "intelligent fulfillment planning" AIP for the advance demand notice order.

The "reply" performative containing the distributor's confirmation number is received at the customer agent server 12. The performative gets passed to the domain manager 74 which, in turn, passes it to the AIP manager 76 citing the open AIP and the step that is awaiting confirmation. The AIP manager 76 has the knowledge manager add the confirmation information to the ontology 92. A "subscribe" performative is then issued to listen for status updates on the fulfillment of the advance demand notice order [C-EP0.2]. The AIP manager 76 has the "information type" algorithm executor agent 84 create the necessary "subscribe" performative, and sends it to the communications layer 60 which then dispatches the message to the broker 10. This completes the "submit advance demand notice order" AIP for the customer so it is closed.

The broker 10 receives the "subscribe" performative and sets up an entry in the publish/subscribe database 56 to service this request. The broker 10 also sends the "subscribe" performative to the distributor agent server 12 to inform the distributor to send status change messages when they occur. The distributor's AIP manager 76 begins to execute the activity tasks for the "intelligent fulfillment planning" AIP [G-P4.1, G-P4.2, G-P4.3, and G-P4.4]. A number of rule sets will be involved in this planning activity.

The distributor's "planning" agent which is working with the intelligent order fulfillment planning system 30 detects that the customer did not provide any probability of need on the advance demand notice order nor was there any age of the current widget 1 indicated on the advance demand notice order. The activity script in the AIP indicates that under this condition additional information about the age of the subject part must be solicited from the customer. [G-P4.1]. Accordingly, the "planning" agent instructs the domain manager 74 to initiate an "equipment age/condition query" AIP to solicit some additional information from the customer's ontology 92. In the meantime, the "planning agent" suspends any further work on the fulfillment plan until a "reply" performative is received from the customer agent server 12.

The customer receives the "evaluate" performative and opens up a new "equipment age/condition query" AIP instance. The agent complex determines that it does not know the exact age of the widget in question. However, a rule set in the ontology 92 enable the agents to estimate the age with a certain confidence level. Furthermore, the condition monitoring database has more details on the actual monitored condition of widget 1. All of this information gets packaged up in a "reply" performative according to the activity script in the AIP. When the "reply" performative is dispatched back to the distributor agent server 12 and the customer's AIP manager 76 closes out the "equipment age/condition query" AIP instance.

When the distributor agent server 12 receives the "reply" performative work on the fulfillment plan is resumed. The rule sets in the ontology 92 synthesize data from the Equipment Knowledge Base together with the data in the "reply" performative to estimate that the probability of need will be 87%. This enables a fulfillment plan to be created. Upon completion of the intelligent fulfillment planning AIP, the distributor's AIP manager 76 initiates and "advance demand notice order staging" AIP to execute against the fulfillment plan [G-P4.4 and G-D1.3].

Since the distributor's ontology 92 indicates that the customer has subscribed to status updates, "advance demand notice order update" AIPs are initiated. In this example a first performative is passed to the customer agent server 12 with the information that the probability of need has been estimated to be 87%. A further performative is passed to the customer agent server 12 which indicates that a fulfillment plan has been designated and will meet the customer's level of service specifications for both line items. As the "subscribe" performative requested that the status updates be sent as "insert" performatives, the distributor agent server 12 formats the status as "insert" performatives [C-EP0.3].

When the ordered widgets have been staged according to the level of service specifications and the appropriate status message sent to the customer agent server and entered into the ontology 92 of the customer, the system enters a stand-by mode. On the day before the maintenance is to be performed, the CMMS 16 extracts all the maintenance work orders for the next day. This action is detected by the legacy system interface agent 80 which sends an alert to the customer's domain manager 74. The domain manager 74 schedules a "verify maintenance readiness" AIP. This AIP scans the ontology 92 for the status of the advance demand notice order fulfillment. Since the status indicates the products have been staged, the agents determine there is no need to delay the maintenance. If there had been a staging problem, the agents would have followed the AIP script to create a workflow event to notify the maintenance manager of the staging problem.

The maintenance worker begins the inspection portion of the maintenance task on the designated day [CM6]. The inspections reveals that widget 1 is failing and needs to be replaced. The maintenance worker makes these entries in the CMMS system 16 and notes that widget 1 is available from the local storeroom. This widget is immediately requisitioned from the storeroom. However, widget 2 will need to be picked up at the local distributor branch where it has been staged.

The CMMS system 16 creates the purchase order to take delivery of the parts reserved under the advance demand notice order [C-S1.1]. The CMMS system 16, through the legacy interface agent 80, requests the domain manager 74 to create the correct performative to immediately send the purchase order to the distributor agent server 12. The domain manager 74 determines that the "deliver reserved advance demand notice order product" AIP will be used. This AIP creates a high priority message containing a "begin-transaction" performative for the purchase order.

The distributor agent server 12 receives the "begin-transaction" performative with the purchase order and the designation of a "deliver reserved advance demand notice order product" AIP [G-D1.2]. This AIP directs the purchase order information to be entered into the distributor's order management system 26 as a high priority transaction. Also, because this purchase order is under transaction semantics control (caused by the "begin-transfer" performative), it will not be committed until the branch confirms that widget 2 has been placed in the will-call bin and the distribution center confirms that is has added the picking up and delivery of widget 1 to this work list [G-D1.3 through G-D1.7 for widget 1 and G-D1.9 for widget 2]. When both of these are completed, the purchase order transaction is committed and the customer's agent server 12 is notified. If there had been a problem either at the branch or at the distribution center, the transaction would have been aborted and both the distributor and customer would have been notified.

When the customer picks-up widget 2 from the distribution branch, the distributor's order management system 26 completes that line item of the purchase order. [G-D1.10, G-D1.11 and C-S1.2]. Widget 2 may then be used in connection with widget 1 to effect the repair [CM6] and the maintenance work order is completed and closed out in the CMMS 16 [CM7]. The legacy system interface agent 80 detects that the work order has been completed and closed and triggers an alert to the domain manager 74. This initiates an AIP to be executed which updates the ontology 92 accordingly and eliminates all the detailed status data that will no longer be needed for analysis purposes. Another AIP will be initiated to transfer the maintenance results information to the distributor agent server 12 so that the data can be included in the Equipment Knowledge Base [KB]. By compiling the completed maintenance information which records what parts were actually replaced and what the general condition of the equipment was both before and after the maintenance, the information will be used in the future to help determine the probability of need for future advance demand notice orders.

Meanwhile, the distribution center picks, packs and ships widget 1 [G-D1.9 and G-D1.10]. The distributor's logistics systems create the shipping manifest and get the track/trace identification for the shipment [T-D1.10]. This is then passed to the distributor's ontology 92. The AIP involved requires that the shipping information be sent to the transportation agent server 12 so that shipping status information can be monitored. As shipping status is captured from the carrier, it is passed to the customer agent server 12 since the customer requested a subscription to the status data. The shipping status data is recorded in the ontology 92 of the customer. This enables the customer's staff to view the status via the user interface web server 82 if desired.

When widget 1 is delivered to the customer [C-S1.2], the carrier captures the delivery signature confirmation and records it in its system [T-D1.11]. The transportation agent server 12 will capture the delivery status and form a "tell" performative to advise the distributor agent server 12 of the receipt. The status is passed to the distributor's order management system 26 which, in turn, completes the entire purchase order and invoices the customer [G-D1.13].

While specific embodiments of the invention have been described in detail, it will be appreciated by those skilled in the art that various modifications and alternatives to those details could be developed in light of the overall teachings of the disclosure. For example, the term "intelligent agent" has been used in both the singular and plural senses throughout this disclosure. This usage is not intended to be limiting and, as such, when a task is recited as being performed by an intelligent agent or agents, it will be appreciated that the recited task may be performed by one or a collaboration of intelligent agents residing on one or more computer systems. Accordingly, the particular arrangements disclosed are meant to be illustrative only and not limiting as to the scope of the invention which is to be given the full breadth of the appended claims and any equivalents thereof.

What is claimed is:

1. A system for positioning items within a supply chain network having a plurality of geographic locations, comprising:
   a customer maintenance system into which a work order is entered including information that identifies a piece of equipment to be repaired and at least one item expected to be used during a repair procedure;
   a customer agent system in communication with the customer maintenance system which extracts from the work order entered into the customer maintenance system the information that identifies the at least one item expected to be used during the repair procedure and which uses the information extracted from the work order entered into the customer maintenance system to create an advance demand notice order for the at least one item; and
   a distributor system in communication with the customer agent server which responds to a receipt of the advance demand notice order that was created using the information extracted from the work order to:
   a) determine if the advance demand notice order includes a probability that the at least one item will need to be used during the repair procedure;
   b) estimate, using at least forecast data associated with one or more of the piece of equipment and the at least one item which forecast data is extracted from a database of forecast data accessible to the distributor system, the probability that the at least one item will need to be used during the repair procedure when it is determined that the advance demand notice order fails to include the probability that the at least one item will need to be used during the repair procedure;
   c) determine a cost associated with moving the at least one item within the supply chain;
   d) determine, based upon the probability that the at least one item will need to be used during the repair procedure, a customer specified level of service associated with the advance demand notice, and the cost associated with moving the at least one item within the supply chain, a plurality of fulfillment plans for the at least one item each of which includes a specification of a one of the plurality of geographic locations within the supply chain from which the at least one item is to be sourced and a one of the plurality of geographic locations within the supply chain at which the at least one item is to be positioned prior to commencement of the repair procedure; and
   e) select one of the plurality of fulfillments plans for implementation;
   a supplier system that cooperates with the distributor system by initiating a replenishment of the at least one item at the one of the plurality of geographic locations within the supply chain from which the at least one item is to be sourced in accordance with the selected fulfillment plan; and
   a transportation agent system in communication with the distributor system that coordinates with the distributor system to assist in moving the at least one item between the one of the plurality of geographic locations within the supply chain from which the at least one item is to be sourced and the one of the plurality of geographic locations within the supply chain at which the at least one item is to be positioned in accordance with the selected fulfillment plan.

2. The system as recited in claim 1, wherein the forecast data comprises one or more of historical data indicative of prior consumption rates of the at least one item by a customer that is to repair the piece of equipment, deterministic demand data indicative of scheduled maintenance activity for the piece of equipment, and non-deterministic demand data indicative of scheduled maintenance activity for the piece of equipment compared to historical unscheduled maintenance activity for the piece of equipment.

3. The system as recited in claim 1, wherein the customer specified level of service comprises a customer desired one of the geographic locations within the supply chain at which the at least one item is to be positioned in response to the advance demand notice.

4. The system as recited in claim 1, wherein the cost associated with moving the at least one item within the supply chain comprises one or more of an activity cost, a transportation cost, a holding cost, and an opportunity cost.

5. The system as recited in claim 1, wherein the customer maintenance system comprises a computerized maintenance management system.

6. The system as recited in claim 1, wherein the customer maintenance system comprises an enterprise asset management system.

7. The system as recited in claim 1, wherein the customer agent server comprises an intelligent agent that extracts the information from the customer maintenance system in response to a user entering or modifying a work order.

8. The system as recited in claim 1, wherein the distributor system comprises an intelligent agent in communication with the transportation agent system that monitors movement of the at least one item within the supply chain.

9. The system as recited in claim 3, wherein the intelligent agent forms a corrective fulfillment plan if the intelligent agent determines that the at least one item is not being moved within the supply chain in accordance with the selected fulfillment plan.

10. The system as recited in claim 1, wherein the customer agent server extracts from the customer maintenance system forecast data for populating the database used in connection with estimating the probability that the at least one item will need to be used during the repair procedure.

11. The system as recited in claim 1, wherein the distributor system further uses one or more of a calculated distributor margin associated with fulfilling the advance demand notice and a customer pricing tolerance associated with fulfilling the advance demand notice when determining a plurality of fulfillment plans for the at least one item.

* * * * *